(12) United States Patent
Chu

(10) Patent No.: US 10,331,971 B2
(45) Date of Patent: Jun. 25, 2019

(54) SYSTEM AND METHOD FOR BLIND IMAGE QUALITY ASSESSMENT

(71) Applicant: SHENZHEN UNIVERSITY, Shenzhen, Guangdong (CN)

(72) Inventor: Ying Chu, Guangdong (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 88 days.

(21) Appl. No.: 15/557,562

(22) PCT Filed: Mar. 11, 2016

(86) PCT No.: PCT/CN2016/076172
§ 371 (c)(1),
(2) Date: Sep. 12, 2017

(87) PCT Pub. No.: WO2016/146038
PCT Pub. Date: Sep. 22, 2016

(65) Prior Publication Data
US 2018/0075318 A1    Mar. 15, 2018

(30) Foreign Application Priority Data

Mar. 13, 2015  (CN) .......................... 2015 1 0111983

(51) Int. Cl.
*G06K 9/03*       (2006.01)
*G06K 9/48*       (2006.01)
(Continued)

(52) U.S. Cl.
CPC ............ *G06K 9/481* (2013.01); *G06K 9/036* (2013.01); *G06K 9/527* (2013.01); *G06K 9/6218* (2013.01);
(Continued)

(58) Field of Classification Search
CPC ...... H04N 21/466; H04N 5/84; H04N 19/182; H04N 5/357
(Continued)

(56) References Cited

U.S. PATENT DOCUMENTS 7,336,844 B2 *  2/2008  Pike ........................ G06T 5/003
                                                    382/254
7,515,467 B2 *  4/2009  Yuda .................... G11C 11/5671
                                                    365/185.03
(Continued)

FOREIGN PATENT DOCUMENTS

CN       102799870 A     11/2012
CN       102855631 A      1/2013
(Continued)

OTHER PUBLICATIONS

International Search Report and Written Opinion in PCT/CN2016/076172 dated Jun. 1, 2016, 12 pages.
(Continued)

*Primary Examiner* — Yosef Kassa
(74) *Attorney, Agent, or Firm* — Metis IP LLC

(57) ABSTRACT

The present disclosure relates to a system and method for codebook construction and use thereof in image quality assessment. A codebook including a plurality of code words may be provided. Each one of the plurality of code words may have a reference score relating to image quality. A test image may be acquired. One or more feature vectors may be extracted from the test image based on statistical independence between neighboring divisive normalization transform coefficients of the test image. A score may be generated based on a comparison between the extracted feature vectors of the test image and at least some of the plurality of code words in the codebook and the corresponding reference scores of the code words.

18 Claims, 23 Drawing Sheets

(51) Int. Cl.
  *G06K 9/52* (2006.01)
  *G06K 9/62* (2006.01)
  *G06T 7/00* (2017.01)
(52) U.S. Cl.
  CPC ......... *G06K 9/6272* (2013.01); *G06K 9/6277* (2013.01); *G06T 7/0002* (2013.01); *G06T 2207/30168* (2013.01)
(58) Field of Classification Search
  USPC ............... 382/156, 157, 159, 170, 260, 275; 358/537, 401.452, 463
  See application file for complete search history.

(56) References Cited

U.S. PATENT DOCUMENTS

| | | | | |
|---|---|---|---|---|
| 7,616,826 | B2* | 11/2009 | Freeman | G06T 5/003 348/208.4 |
| 8,452,122 | B2* | 5/2013 | Hitomi | G06T 3/4015 345/20 |
| 8,553,097 | B2* | 10/2013 | Ishii | G06T 5/003 348/208.4 |
| 8,660,372 | B2* | 2/2014 | Bovik | G06K 9/00664 382/190 |
| 2014/0140396 | A1 | 5/2014 | Wang | |

FOREIGN PATENT DOCUMENTS

| | | |
|---|---|---|
| CN | 103325113 A | 9/2013 |
| CN | 103366378 A | 10/2013 |
| CN | 104376565 A | 2/2015 |
| CN | 104751456 A | 7/2015 |

OTHER PUBLICATIONS

First Office Action in Chinese Application No. 201510111983.0 dated Jun. 1, 2016, 18 pages.

Chu, Ying et al., A Blind Quality Assessment Method for Images Using Shape Consistency Feature: Journal of Xi'an Jiaotong University, 48(8): 12-17 (2014).

Niu, Zhibin, Research on Key Techniques of Image Representation in Recognition. Chinese Master's Dissertations Full-text Database Information Science and Technology (2011).

Wang, Yanxia, Research on Key Techniques and Algorithms of Palmprint Recognition: Chinese Doctoral Dissertations Full-text Database Information Science and Technology (2009).

* cited by examiner

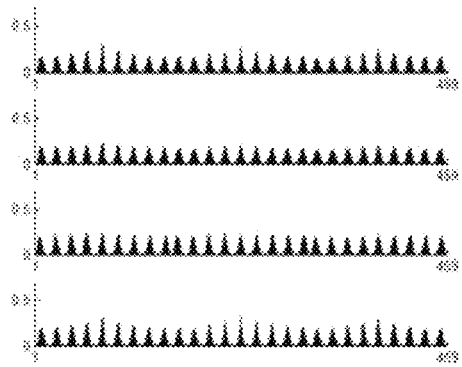
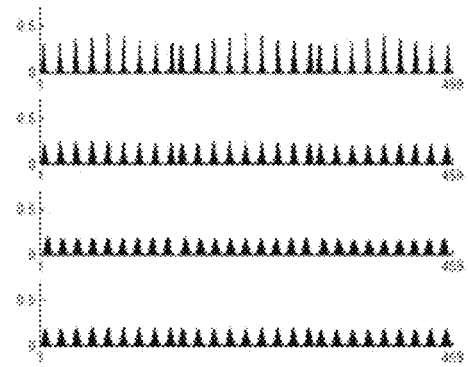
FIG. 14A
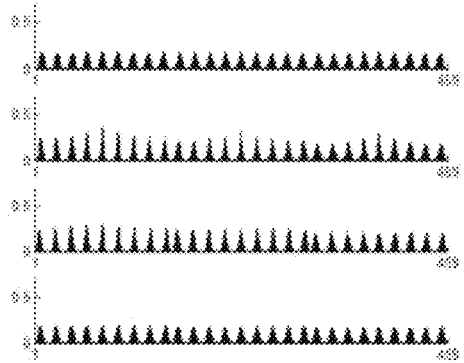
FIG. 14B
FIG. 14C

SYSTEM AND METHOD FOR BLIND IMAGE QUALITY ASSESSMENT

CROSS REFERENCE TO RELATED APPLICATIONS

This application is a U.S. national stage of International Application No. PCT/CN2016/076172, filed on Mar. 11, 2016, designating the United States of American and published in English on Sep. 22, 2016, which in turn claims priority of Chinese Patent Application No. 201510111983.0 filed on Mar. 13, 2015, each of which is hereby incorporated by reference.

TECHNICAL FIELD

The present disclosure generally relates to an image quality assessment system, and more particularly, to a system and method for blind image quality assessment.

BACKGROUND

Study of the Image Quality Assessment (IQA) focuses on how to use one or more objective indicators to objectively evaluate image quality. The objective evaluation may be an estimate of a subjective assessment of the image quality.

Image quality assessment may have broad applications. In the field of image de-noising, image restoration, image enhancement and image fusion, objective indicators of image quality assessment may be used to compare the performance of different algorithms or choose parameters for an algorithm. Additionally, in the field of image coding and communications, objective indicators of image quality assessment may be used to guide the image compression, transmission, reception, and evaluate the performance of different algorithms and systems.

Depending on how much information of a reference image is needed, in general, the objective image quality assessment algorithms may be divided into three types: Full-Reference (FR), Reduced-Reference (RR), and No-Reference (NR). However, there are numerous cases where a reference image may be unavailable. For instance, the assessment of the quality of a de-noising algorithm on an image, where the corresponding noise-free image is unknowable or unavailable. In this case, one may need to employ a "no-reference" or "blind" measure to render a quality assessment. A challenge that confronts conventional image quality assessment systems is to provide assessments when neither the reference image nor the image distortion type is known.

In the study of blind image quality assessment, a variety of perceptual features may be used to assess the image quality. Existing methods, after extracting features, are unable to determine the relationship between the features and image quality, and use training—test mode for image quality assessment. During the training stage, features extracted from training images together with their corresponding subjective scores may be used to train a regression model. During the test stage, the objective scores of test images corresponded to perceptual features extracted from the test images may be predicted using the trained regression model. Thus, there is the need for a system and method to robustly and efficiently assess image quality.

SUMMARY OF THE INVENTION

In a first aspect of the present disclosure, provided herein is a method. The method may include acquiring a plurality of training images, each training image having a reference score relating to image quality, extracting one or more feature vectors based on statistical independence between neighboring divisive normalization transform coefficients of each training image; identifying cluster centers of the feature vectors of the plurality of training images; and generating code words based on the cluster centers.

In some embodiments, a training image of the plurality of training images may include at least one distortion type of JPEG Compression, JPEG2000 Compression, White Gaussian Noise, or Gaussian Blurring.

In some embodiments, extracting feature vectors based on statistical independence between neighboring divisive normalization transform coefficients may include connecting a plurality of conditional histograms to generate a joint conditional histogram, the plurality of conditional histograms are conditioned at different values.

In some embodiments, the statistical independence between neighboring DNT coefficients may be based on a pattern of joint conditional histograms between neighboring DNT coefficients.

In some embodiments, the reference score of a training image may be a subjective score.

In some embodiments, the number of the feature vectors extracted from a training image may be 16.

In some embodiments, the dimension of one of the one or more feature vectors may be 459.

In some embodiments, cluster centers may be identified based on spectral clustering.

In some embodiments, the method as described above may further include optimizing the code words based on a fast bacterial swarming algorithm.

In a second aspect of the present disclosure, provided herein is a method. The method may include providing a codebook including a plurality of code words, each one of the plurality of code words having a reference score relating to image quality; acquiring a test image; extracting one or more feature vectors of the test image based on statistical independence between neighboring divisive normalization transform coefficients of the test image; and generating a score based on a comparison between the extracted one or more feature vectors of the test image and at least some of the plurality of code words and the corresponding reference scores.

In some embodiments, the generation of a score as described above may further include comparing the extracted one or more feature vectors of the test image with the at least some of the plurality of code words; identifying a code word based on the comparison; and determining the score of the test image based on the reference score of the identified code word.

In some embodiments, the comparing as described above may further include determining a Euclidean distance between the extracted one or more feature vectors and each one of the at least some of the plurality of code words.

In some embodiments, the identifying the code word as described above may be based on the Euclidean distances.

In some embodiments, the method as described above may further include that the identifying a code word includes identifying more than one code words; and the determining the score of the test image includes calculating the score of the test image based on the reference scores of the identified code words.

In a third aspect of the present disclosure, provided herein a system. The system may include an acquisition module for acquiring a plurality of images, each image having a reference score relating to image quality; a feature extractor that, for each one of the plurality of images, extracts one or more feature vectors based on statistical independence between neighboring divisive normalization transform coefficients of the image; a clustering module that identifies cluster centers based on the feature vectors of the plurality of images; and a codebook module that generates code words based on the cluster centers and the reference scores corresponding to the images In a fourth aspect of the present disclosure, provided herein a system. The system may include a codebook including a plurality of code words, each one of the plurality of code words having a reference score relating to image quality; an acquisition module that acquires an image; a feature extractor that extracts one or more feature vectors based on statistical independence between neighboring divisive normalization transform coefficients of the image; and a quality determination module that generates a score based on the comparison between the extracted one or more feature vectors with at least some of the plurality of code words in the codebook and the corresponding reference scores.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

The following description is presented to enable any person skilled in the art to make and use the disclosure, and is provided in the context of a particular application and its requirements. Various modifications to the disclosed embodiments will be readily apparent to those skilled in the art, and the general principles defined herein may be applied to some embodiments and applications without departing from the spirit and scope of the present disclosure. Thus, the present disclosure is not limited to the embodiments shown, but is to be accorded the widest scope consistent with the claims.

It will be understood that when a module or unit is referred to as being "on," "connected to," or "coupled to" another module or unit, it may be directly on, connected or coupled to the other module or unit or intervening module or unit may be present. In contrast, when a module or unit is referred to as being "directly on," "directly connected to" or "directly coupled to" another module or unit, there may be no intervening module or unit present. As used herein, the term "and/or" includes any and all combinations of one or more of the associated listed items.

The terminology used herein is for the purpose of describing particular example embodiments only and is not intended to be limiting. As used herein, the singular forms "a," "an" and "the" may be intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Blind image quality assessment may be implemented on a computer having one or more computer processors, memory units, storage devices, computer software, and other components.

The term "blind image quality assessment" as used herein may refer to employing objective indicators to evaluate the quality of an image without a reference image and without knowing the distortion type(s) of the image. In some embodiments, exemplary objective indicators may include, without limitation, a score, a level, a grade, or percentage. The term "reference image" as used herein may refer to a natural image without any distortion. A reference image may be a true or accurate image representation of, for example, an object, a scene, or the like, or a combination thereof. For example, exemplary reference image may include one or more images from Kodak Lossless True Color Image Suite. The term "distortion" as used herein may refer to the degradation of image quality from image acquisition to image perception by the human visual system. For example, exemplary distortion types may include, without limitation, JPEG Compression, JPEG2000 Compression, White Gaussian Noise, or Gaussian Blurring.

Figure 1:
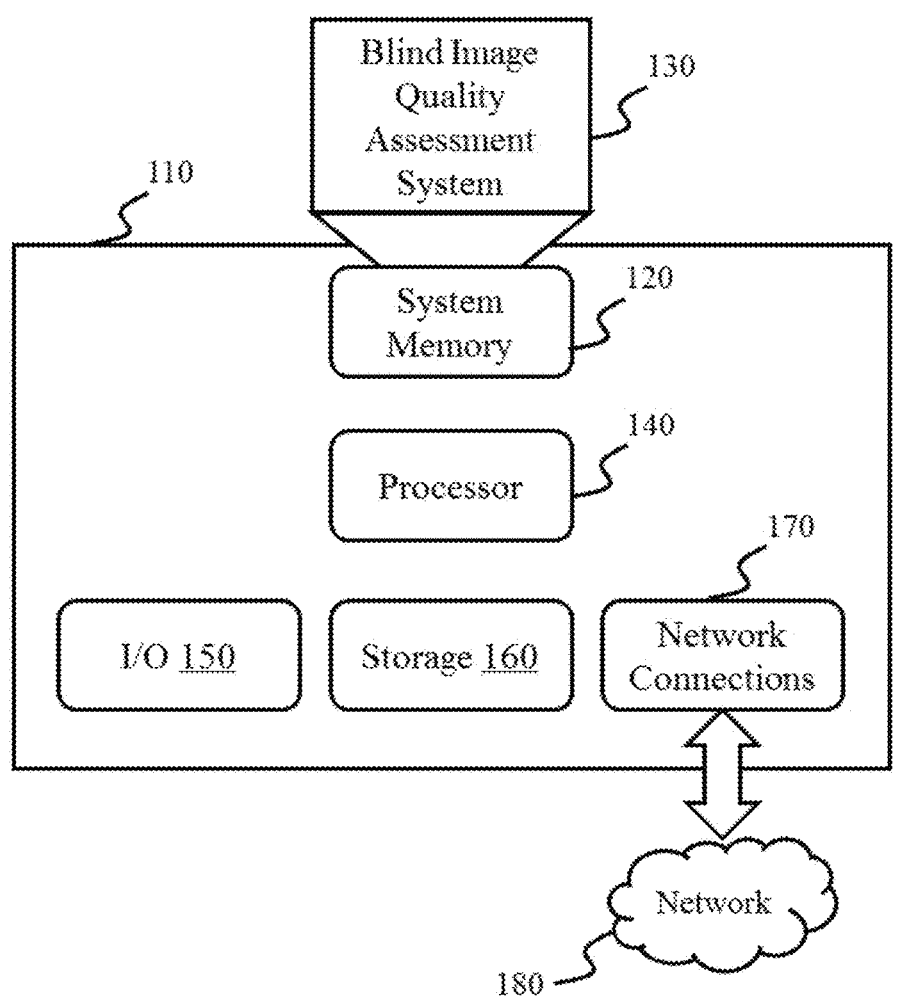
FIG. 1 illustrates a computer on which a blind image quality assessment system may be implemented according to some embodiments of the present disclosure.

FIG. 1 illustrates a block diagram of a computer on which a blind image quality assessment system may be implemented according to some embodiments of the present disclosure. The computer 110 may include a processor 140. Merely by way of examples, the processor 140 may include a microcontroller, a reduced instruction set computer (RISC), application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an acorn reduced instruction set computing (RISC) machine (ARM), or any other suitable circuit or processor capable of executing computer program instructions, or the like, or any combination thereof. The processor 140 may control the operations of the computer 110 based on instructions. The instructions may be stored in a storage 160. The instructions may be loaded into a system memory 120 when the execution of the instructions is desired.

The storage 160 may include storage media such as magnetic or optical media, e.g., disk (fixed or removable), tape, CD-ROM, DVD-ROM, CD-R, CD-RW, DVD-R, DVD-RW, Blu-Ray, etc. The system memory 120 may include volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM)), ROM, nonvolatile memory (e.g. Flash memory) accessible via a peripheral interface such as the USB interface, etc. If executed, the computer program instructions loaded into the system memory 120 may initialize a Blind Image Quality Assessment system 130 in the computer 110 to perform one or more actions or operations, as further described below.

The computer 110 may also include one or more network connections 170 for communicating with one or more other devices via a network 180. The network connections 170 may be wired connections or wireless connections. The wired network connections may include using a metal cable, an optical cable, a hybrid cable, an interface, or the like, or any combination thereof. The wireless network connections may include using a wireless local area network (WLAN), a Local Area Network (LAN), a Wide Area Network (WAN), a Bluetooth, a ZigBee, a Near Field Communication (NFC), or the like, or any combination thereof. The computer 110 may also include input/output devices 150 that enable user interaction with the computer 110 (e.g., display, keyboard, mouse, speakers, buttons, etc.).

Figure 2:
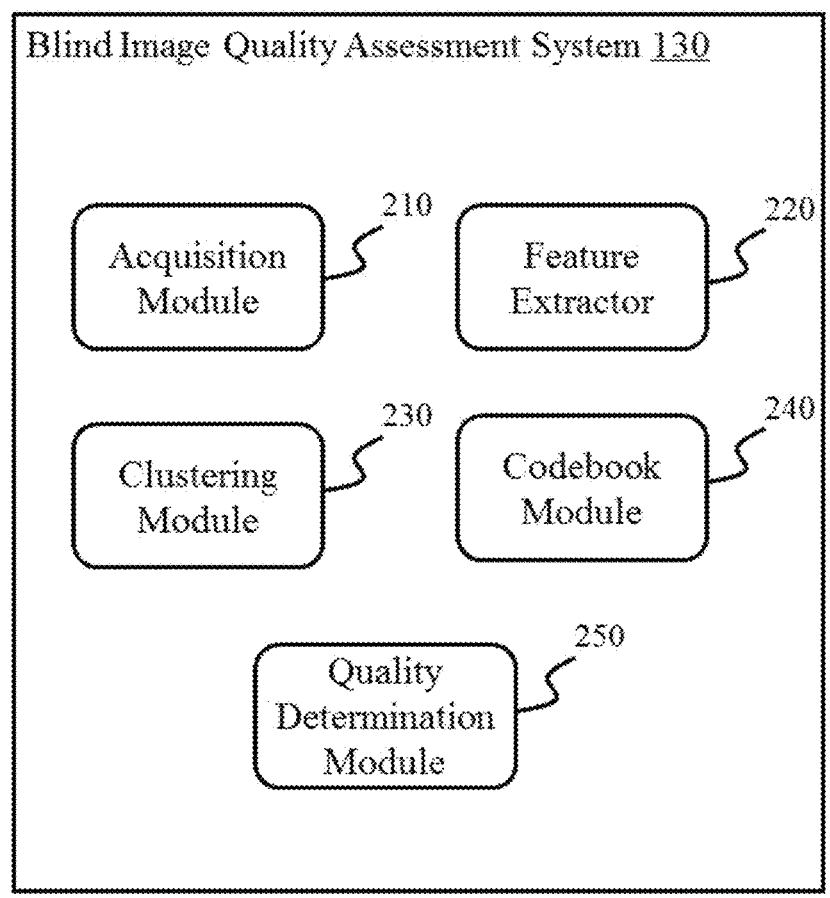
FIG. 2 is a block diagram of a blind image quality assessment system according to some embodiments of the present disclosure.

FIG. 2 illustrates a block diagram of a blind image quality assessment system 130 according to some embodiments of the present disclosure. In some embodiments, the blind image quality assessment system 130 may implement an algorithm for blind image quality assessment. As shown in FIG. 2, the blind image quality assessment system 130 may include an acquisition module 210, a feature extractor 220, a clustering module 230, a codebook module 240, and a quality determination module 250.

As shown in FIG. 2, the acquisition module 210 may acquire one or more images for assessment. Images acquired may include but are not limited to natural images without distortion (e.g., Kodak Lossless True Color Image Suite), distorted images with a same distortion type, distorted images with different distortion types, etc. Exemplary distortion types may include JPEG Compression, JPEG2000 Compression, JPEG Transmission Errors, JPEG 2000 Transmission Errors, Non Eccentricity Pattern Noise, Local Block-wise Distortions of Different Intensity, Mean Shift, Contrast Change, White Gaussian Noise, Additive Gaussian Noise, Additive White Gaussian Noise, Additive Pink Gaussian Noise, Additive Noise in Color Components, Spatially Correlated Noise, Masked Noise, High Frequency Noise, Impulse Noise, Quantization Noise, Image De-noising, Gaussian Blurring, Fast Fading Rayleigh, Global Contrast Decrements, or the like, or a combination thereof. In some embodiments, the image(s) may be acquired from the input/output devices 150 (e.g., a camera, a webcam, a scanner, etc.). In some embodiments, the image(s) may be acquired from the storage 160 (e.g., a magnetic disk, tape, CD-ROM, DVD-ROM, CD-R, CD-RW, DVD-R, DVD-RW, Blu-Ray, etc.). In some embodiments, the image(s) may be acquired from the network 180 via network connections 170 (e.g., a LAN, a WAN, a Bluetooth, a ZigBee, a NFC, etc.).

In some embodiments, the images may include training images and test images. The term "training image" as used herein may refer to an image used to generate code words of a codebook. A training image may have a reference score. The term "reference score" used herein may refer to a score regarding its image quality. Exemplary reference score may be a subjective score. The term "subjective score" as used herein may refer to a score indicating a rating of image quality by a human observer. In some embodiments, exemplary subjective scores may include subjective scores of the images from one or more public databases (e.g., LIVE, CSIQ, TID2008, TID2013, A57, MICT, IVC, IVC Art, etc.). In some embodiments, a training image may be an image from a database. Exemplary databases may include Laboratory for Image and Video Engineering (LIVE), Categorical Image Quality Database (CSIQ), TID2008, TID2013, A57, Media Information and Communication Technology (MICT), IVC, IVC Art, etc. The term "test image" as used herein may refer to an image to be evaluated based on a codebook. In some embodiments, the test images may be a set of images different from training images.

The feature extractor 220 may extract a feature vector of an acquired image. The term "feature vector" of an image as used herein may refer to a vector constructed based on statistical independence between neighboring divisive normalization transform (DNT) coefficients of the image. Merely by way of example, a feature vector may include a multi-dimensional vector constructed based on the pattern of a plurality of joint conditional histograms between neighboring DNT coefficients in an image. The term "statistical independence between neighboring DNT coefficients" as used herein may refer to the joint conditional distribution between neighboring DNT coefficients in an image. In some embodiments, statistical independence between neighboring DNT coefficients may be the pattern of joint conditional histograms (conditioned at different values) between neighboring DNT coefficients. The term "joint conditional histogram" as used herein refers to the histogram including a number of conditional histograms conditioned at different values. In some embodiments, a joint conditional histogram may illustrate the statistical relationship between a pair of horizontally neighboring DNT coefficients. In some embodiments, a joint conditional histogram may illustrate the statistical relationship between a pair of vertically neighboring DNT coefficients. In some embodiments, a joint conditional histogram may illustrate the statistical relationship between a pair of main diagonally neighboring DNT coefficients. In some embodiments, a joint conditional histogram may illustrate the statistical relationship between a pair of minor diagonally neighboring DNT coefficients.

In some embodiments, the feature vector extracted from the acquired image may be defined based on the pattern of the joint conditional histogram between neighboring DNT coefficients in the acquired image. In some embodiments, the feature vector of an acquired image may be extracted based on other methods. In some embodiments, the dimension of a feature vector may be no less than 3, or no less than 17, or no less than 153, or no less than 459. In some embodiments, one or more feature vectors may be extracted from one acquired image. For example, 16 feature vectors may be extracted from an acquired image. In some embodiments, one feature vector may be extracted from one acquired image.

The clustering module 230 may identify cluster centers of the extracted feature vectors of training images based on a clustering algorithm. In the present disclosure, the term "cluster center" and the term "centroid" may be used interchangeably. In some embodiments, training images may be acquired from one or more public databases (e.g., LIVE, CSIQ, TID2008, TID2013, A57, MICT, IVC, IVC Art, or the like, or a combination thereof). In some embodiments, exemplary clustering algorithms employed by the clustering module 230 may include but are not limited to the k-means algorithm, or a variation of the k-means algorithm (e.g., k-medoids, k-medians clustering, K-means++, Fuzzy c-means, Spectral Clustering, etc.), or the like, or a combination thereof.

The codebook module 240 may generate code words of a codebook based on the cluster centers generated by the clustering module 230. The term "code word" as used herein may refer to a cluster center identified based on feature vectors of training images. The term "codebook" as used herein may refer to a set of code words. In some embodiments, the codebook module 240 may further perform codebook optimization. In some embodiments, the codebook optimization may be performed based on fast bacterial swarming algorithm.

The quality determination module 250 may compare extracted feature vectors with code words in the codebook and generate an image quality score based on the result of comparison. In some embodiments, the quality determination module 250 may calculate the distances between extracted feature vectors and code words in the codebook, and then calculate the image quality score based on the reference scores associated with the code words and the result of comparison.

It should be appreciated that the aforementioned modules of the blind image quality assessment system 130 may be implemented in hardware or software or in a combination of both. In some embodiments, modules and operations of the blind image quality assessment system 130 may be encompassed by modules and operations of one or more computer programs (e.g., an image management system, an image processer, etc.). In some embodiments, modules and operations of the blind image quality assessment system 130 may be separate from the aforementioned one or more computer programs but may operate cooperatively with modules and operations thereof.

Figure 3:
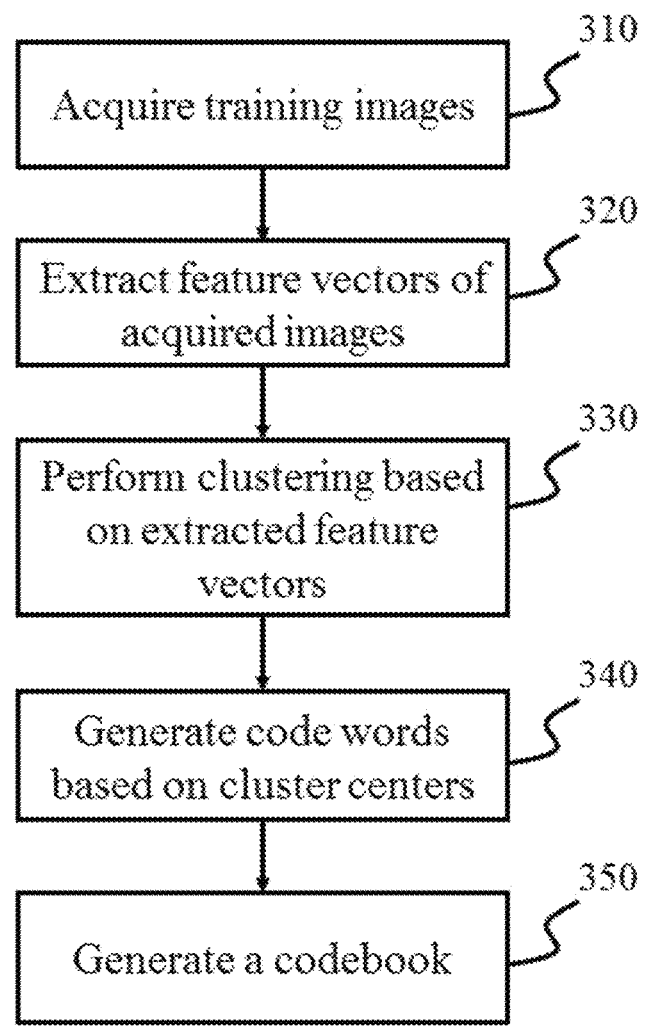
FIG. 3 shows a flowchart of method process for codebook construction according to some embodiments of the present disclosure.

FIG. 3 is a flowchart illustrating a process of codebook construction according to some embodiments of the present disclosure. The flowchart includes a process that may be carried out by one or more processors and/or electronic components under the control of computer-readable and/or computer-executable instructions. Although specific steps are disclosed in the flowcharts, such steps are exemplary. That is, the present embodiments are well suited to performing various other steps or variations of the steps recited in the flowchart. Within various embodiments, it should be appreciated that the steps of the flowchart may be performed by software, by hardware or by a combination of both.

As shown in FIG. 3, in step 310, training images may be acquired. The acquisition of the training images may be accomplished by the acquisition module 210 as described in connection with FIG. 2. The training images acquired may include but are not limited to natural images without distortion (e.g., Kodak Lossless True Color Image Suite), distorted images with a same distortion type, or distorted images with different distortion types (e.g., JPEG Compression, JPEG2000 Compression, etc.) In some embodiments, the training images may be acquired from the input/output devices 150, the storage 160, or the network 180 via network connections 170. In some embodiments, the training images may be images with the ratings of image quality by one or more human observers. The training images may be retrieved from one or more public databases (e.g., LIVE, CSIQ, TID2008, TID2013, A57, MICT, IVC, IVC Art, etc.). In some embodiments, the training images may be images with objective scores of image quality determined by other image quality assessment methods. Other image quality assessment methods may include Full-Reference image quality assessment methods (e.g., Structure Similarity, MSSIM, GSSIM, ESSIM, FSIM, RFSIM, Visible Differences Predictor algorithm, Noise Quality Measure model, Visual Signal to Noise Ratio algorithm, etc.), Reduced-Reference image quality assessment methods (e.g., RR-SSIM, βW-SCM, C4, etc.) or other No-Reference image quality assessment methods (e.g., visual codebook, quality-aware clustering method, etc.).

In step 320, one or more feature vectors of an acquired training image may be extracted. The extraction may be accomplished by the feature extractor 220 as described in connection with FIG. 2. In some embodiments, the extracted feature vectors may be defined based on the pattern of a joint conditional histogram of neighboring DNT coefficients in an acquired image. In some embodiments, the dimension of a feature vector may be no less than 3, or no less than 17, or no less than 153, or no less than 459. In some embodiments, one or more feature vectors may be extracted from one acquired image. For example, 16 feature vectors may be extracted from an acquired image. In some embodiments, one feature vector may be extracted from one acquired image.

In step 330, cluster centers may be identified according to a clustering algorithm based on feature vectors extracted from the acquired training images. The clustering may be accomplished by the clustering module 230 as described in connection with FIG. 2. In some embodiments, clustering algorithms implemented may include but are not limited to the k-means algorithm, or a variation of k-means algorithm (e.g., k-medoids, k-medians clustering, K-means++, Fuzzy c-means, Spectral Clustering, etc.).

In step 340, code words may be generated based on the cluster centers calculated in step 330. The generation of the code words may be accomplished by the clustering module 230 as described in connection with FIG. 2. In some embodiments, the code words generated may be optimized by an optimization algorithm. In some embodiments, exemplary optimization algorithms may include but are not limited to particle swarm optimization (PSO), a bacterial foraging algorithm (BFA), a fast bacterial swarming algorithm (FBSA), or the like, or a combination thereof.

In step 350, a codebook based on the code words generated in step 340 may be generated. The generation of codebook may be accomplished by the codebook module 240 as described in connection with FIG. 2. In some embodiments, the code words may be indexed before the generation of the codebook. In some embodiments, the codebook may contain at least some of the code words generated in step 340.

It should be noted that the above embodiments are provided for the purposes of illustration, and not intended to limit the scope of the present disclosure. After consulting the present disclosure, one skilled in the art may envisage numerous other changes, substitutions, variations, alterations, and modifications without inventive activity, and it is intended that the present disclosure encompasses all such changes, substitutions, variations, alterations, and modifications, as falling within its scope.

Figure 4:
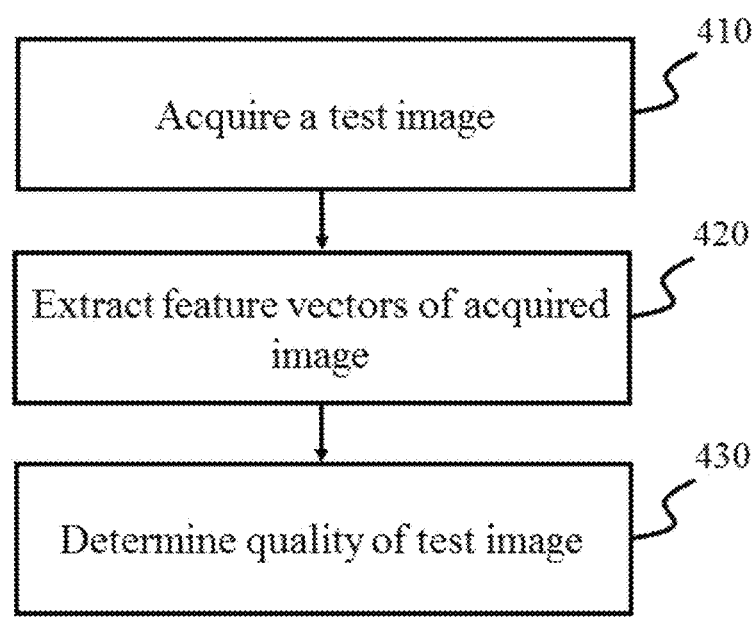
FIG. 4 shows a flowchart of method process for blind image quality assessment according to some embodiments of the present disclosure.

FIG. 4 is a flowchart illustrating a process of blind image quality assessment according to some embodiments of the present disclosure. The flowchart includes a process that may be carried out by one or more processors and/or electronic components under the control of computer-readable and/or computer-executable instructions. Although specific steps are disclosed in the flowcharts, such steps are exemplary. That is, the present embodiments are well suited to performing various other steps or variations of the steps recited in the flowchart. Within various embodiments, it should be appreciated that the steps of the flowchart may be performed by software, by hardware or by a combination of both.

Referring to FIG. 4, in step 410, a test image may be acquired. The acquisition may be accomplished by the acquisition module 210 as described in connection with FIG. 2. The test image acquired may include but are not limited to natural images without distortion (e.g., Kodak Lossless True Color Image Suite), distorted images with a same distortion type, distorted images with different distortion types (e.g., JPEG Compression, JPEG2000 Compression, etc.), or the like, or a combination thereof. In some embodiments, the acquired image may be acquired from a new set of images (images not a part of training images). In some embodiments, the test image may be acquired from the input/output devices 150 (e.g., camera, webcam, scanner, etc.). In some embodiments, the test image may be acquired from the storage 160 (e.g., magnetic disk, tape, CD-ROM, DVD-ROM, CD-R, CD-RW, DVD-R, DVD-RW, Blu-Ray, etc.). In some embodiments, the test image may be acquired from the network 180 via network connections 170 (e.g., a WLAN, a LAN, a WAN, a Bluetooth, a ZigBee, a NFC, etc.).

In step 420, one or more feature vectors of the test image may be extracted. In some embodiments, the extracted feature vectors may be defined based on the pattern of a joint conditional histogram of neighboring DNT coefficients in an acquired image. In some embodiments, the dimension of a feature vector may be no less than 3, or no less than 17, or no less than 153, or no less than 459. In some embodiments, one or more feature vector may be extracted from one acquired image. For example, 16 feature vectors may be extracted from an acquired image. In some embodiments, one feature vector may be extracted from one acquired image.

In step 430, an image quality score may be generated based on the comparison between the one or more extracted feature vectors of the test image and code words in a codebook. The generation of the codebook pertaining to the present disclosure is described in FIG. 3. In some embodiments, feature vectors extracted from the test image may be compared with all code words in the codebook. In some embodiments, feature vectors extracted from the test images may be compared with some of the code words in the codebook (e.g., code words representing the same distortion type). In some embodiments, the comparison between the one or more extracted feature vectors and code words may include: a) calculating the Euclidean distance between the one or more extracted feature vectors of the test image and code words in the codebook; b) repeating a) for one or more code words in the codebook; and c) matching feature vectors with one or more code words based on the calculated Euclidean distances.

In some embodiments, the processes as described in FIG. 3 and FIG. 4 may be combined into one. The flowchart includes a process that may be carried out by one or more processors and/or electronic components under the control of computer-readable and/or computer-executable instructions. Although specific steps are disclosed in the flowcharts, such steps are exemplary. That is, the present embodiments are well suited to performing various other steps or variations of the steps recited in the flowchart. Within various embodiments, it should be appreciated that the steps of the flowchart may be performed by software, by hardware or by a combination of both.

Figure 5:
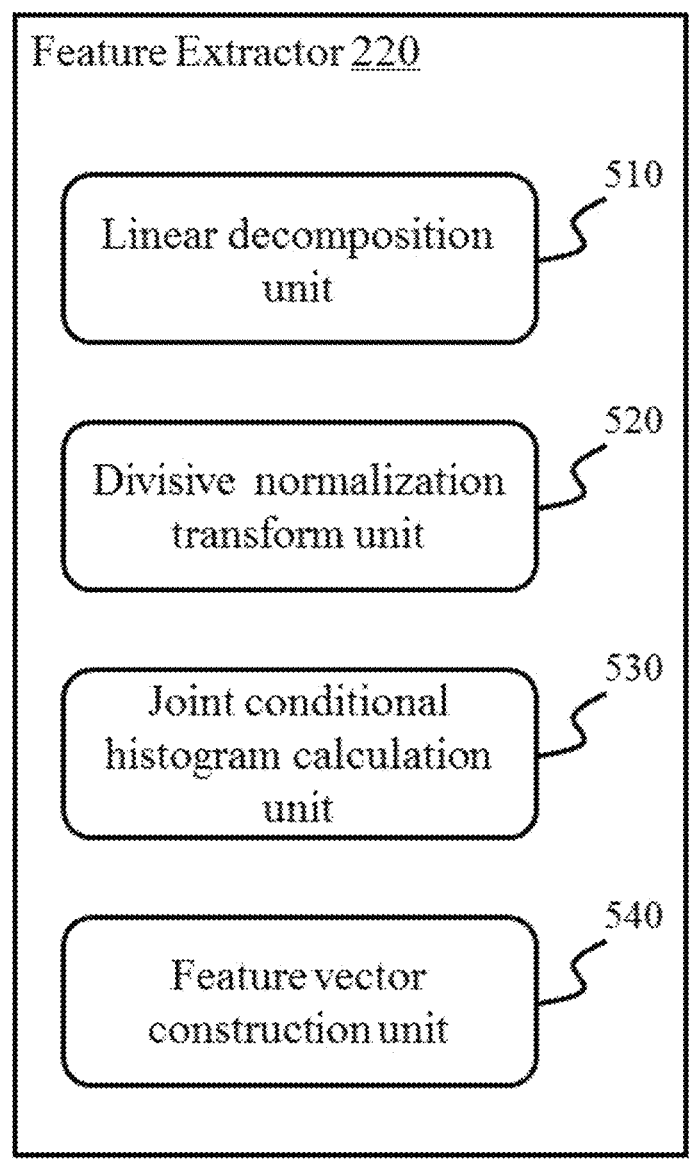
FIG. 5 shows a block diagram of a feature extractor in a blind image quality assessment system according to some embodiments of the present disclosure.

FIG. 5 shows a block diagram of a feature extractor in a blind image quality assessment system 130 according to some embodiments of the present disclosure. In some embodiments, units of the feature extractor 220 may implement an algorithm for feature vector extraction. As shown in FIG. 5, the feature extractor 220 may include a linear decomposition unit 510, a divisive normalization transform unit 520, a joint conditional histogram calculation unit 530, and a feature vector construction unit 540.

The linear decomposition unit 510 may perform linear decomposition on an acquired image. Linear decomposition may include but is not limited to Discrete Cosine Transform (DCT), wavelet transform, contourlet transform, curvelet transform, or the like. In some embodiments, steerable pyramid decomposition may be performed on an acquired image.

Linear decomposition may decompose an image into a plurality of sub-bands. Merely by way of example, the linear decomposition may output 12 sub-bands in three different scales and four different orientations. As another example, the linear decomposition may output 48 sub-bands in six different scales and eight different orientations. The term "sub-band" as used herein may refer to coefficients representing spatial information of an image in a particular scale and a particular orientation. Merely by way of example, spatial information of an image may include horizontal, vertical, main diagonal, and minor diagonal spatial information. In some embodiments, exemplary sub-bands may include, without limitation, wavelet coefficients representing spatial information of an image in a particular scale and a particular orientation.

The divisive normalization transform unit 520 may perform divisive normalization transform (DNT) based on linear decomposition coefficients. Divisive normalization transform may be operated on linear decomposition coefficients obtained by linear decomposition such as DCT, wavelet transform, contourlet transform, curvelet transform, or the like. In some embodiments, the divisive normalization transform may output 12 DNT sub-bands in three different scales and four different orientations. As another example, the divisive normalization transform may output 48 DNT sub-bands in six different scales and eight different orientations.

The term "central DNT coefficient" as used herein may refer to a DNT coefficient relating to a central pixel. A central pixel may be any pixel of an image. The term "neighbor" as used herein may refer to a pixel relative to a central pixel. The term "neighboring DNT coefficient" may refer to the DNT coefficient of a neighbor pixel. For brevity, a neighbor pixel may also be referred to as a neighbor. In some embodiments, the neighbor pixel may be one pixel away from the central pixel. In some embodiments, the neighbor pixel may be two or more pixels away from the central pixel. A central pixel may have one or more neighbor pixels. A central pixel may be partially or fully surrounded by one or more neighbor pixels. Merely by way of example, a neighbor may include, without limitation, a spatially adjacent neighbor, a spatially distant neighbor, a scale neighbor, and an orientation neighbor. A spatially adjacent neighbor pixel may be a pixel that is one pixel away from the central pixel whose DNT coefficient may be in the same sub-band as the neighbor. A spatially distant neighbor may be a pixel that is two pixels away from the central pixel whose DNT coefficient may be in the same sub-band. A scale neighbor may refer to a pixel whose DNT coefficient may share a same position in a neighboring sub-band as a central pixel; the neighboring sub-bands may be in the same orientation but different scales. An orientation neighbor may refer to a pixel whose DNT coefficient may share a same position in a neighboring sub-band; the neighboring sub-bands may be in the same scale but different orientations. A neighbor relationship may exist between a central DNT coefficient and a neighboring DNT coefficient. The neighbor relationship may include, without limitation, a spatial neighbor relationship, a scale neighbor relationship, or an orientation neighbor relationship.

The joint conditional histogram calculation unit 530 may calculate a joint conditional histogram based on neighboring DNT coefficients. In some embodiments, the joint conditional histogram may illustrate a relationship between a pair of spatially neighboring DNT coefficients (horizontally, vertically, main diagonally, and minor diagonally neighboring DNT coefficients). In some embodiments, the bin size of the joint conditional histogram may be set to 17. In some embodiments, the value range of the joint conditional histogram may be normalized to [0, 1]. In some embodiments, a joint conditional histogram may be formed by a number of conditional histograms conditioned at different values. In some embodiments, the number of conditional histograms forming a joint conditional histogram may be no less than 3, or no less than 9, or no less than 27.

The feature vector construction unit 540 may construct a feature vector based on the joint conditional histogram. In some embodiments, a feature vector may be defined based on the pattern of the joint conditional histogram based on the neighboring DNT coefficients. In some embodiments, a feature vector may be defined based on the pattern of a joint conditional histograms conditioned at different values.

It should be appreciated that the aforementioned units of the feature extractor 220 may be implemented in hardware or software or in a combination of both. In some embodiments, units and operations of the Feature Extractor 220 may be encompassed by modules and operations of one or more computer programs (e.g., an image management system). In some embodiments, units and operations of the feature extractor 220 may be separate from the aforementioned one or more computer programs but may operate cooperatively with modules and operations thereof.

Figure 6:
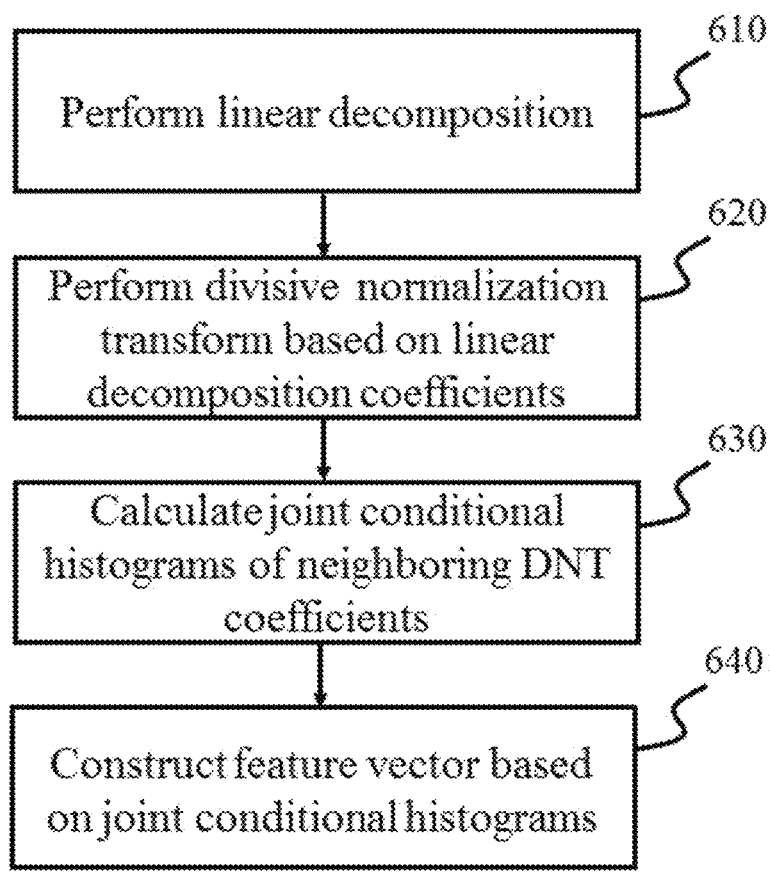
FIG. 6 shows a flowchart of a process for feature vector extraction according to some embodiments of the present disclosure.

FIG. 6 is a flowchart illustrating a process of feature vector extraction according to some embodiments of the present disclosure. The flowchart includes a process that may be carried out by one or more processors and/or electronic components under the control of computer-readable and/or computer-executable instructions. Although specific steps are disclosed in the flowcharts, such steps are exemplary. That is, the present embodiments are well suited to performing various other steps or variations of the steps recited in the flowchart. Within various embodiments, it should be appreciated that the steps of the flowchart may be performed by software, by hardware or by a combination of both.

Referring to FIG. 6, in step 610, linear decomposition may be performed on an acquired image. The linear decomposition may be accomplished by the linear decomposition unit 510 as described in connection with FIG. 5. In some embodiments, steerable pyramid decomposition may be performed to provide linear decomposition coefficients across scale, and orientation for the acquired image. In some embodiments, linear decomposition may decompose an image into a plurality of sub-bands. Merely by way of example, the linear decomposition may output 12 sub-bands in three different scales and four different orientations. As another example, the linear decomposition may output 48 sub-bands in six different scales and eight different orientations.

In step 620, divisive normalization transform may be performed based on the linear decomposition coefficients generated in step 610. The divisive normalization transform may be accomplished by the divisive normalization transform 520 as described in connection with FIG. 5. Divisive normalization transform may be operated on linear decomposition coefficients obtained by linear decomposition including, for example, DCT, wavelet transform, contourlet transform, curvelet transform, or the like. Merely by way of example, the divisive normalization transform may output 12 DNT sub-bands in three different scales and four different orientations. As another example, the divisive normalization transform may output 48 DNT sub-bands in six different scales and eight different orientations.

In step 630, a joint conditional histogram may be calculated based on neighboring DNT coefficients. The calculation of the joint conditional histogram may be accomplished by the joint conditional histogram calculation unit 530 as described in connection with FIG. 5. In some embodiments, steps of calculation of joint conditional histogram may include: i) calculating the joint histograms based on neighboring DNT coefficients; ii) normalizing the value range of the joint histograms to [0, 1]; iii) conditioning the normalized joint histograms at different values to obtain conditional histograms; iv) connecting conditional histograms to form a joint conditional histogram. In some embodiments, the number of conditional histograms connected to form a joint conditional histogram may be no less than 3, or no less than 9, or no less than 27.

In step 640, feature vectors may be constructed based on joint conditional histogram between neighboring DNT coefficients. The feature vector construction may be accomplished by the feature vector construction unit 540 as described in connection with FIG. 5. In some embodiments, feature vector may be defined based on the pattern of a joint conditional histograms conditioned at different values. In some embodiments, the dimension of a feature vector may be no less than 3, or no less than 17, or no less than 153, or no less than 459. In some embodiments, one or more feature vectors may be extracted from one acquired image. For example, 16 feature vectors may be extracted from an acquired image. In some embodiments, the number of feature vector extracted from one acquired image may be other than 16.

It should be noted that the flowchart above is provided for the purposes of illustration, and not intended to limit the scope of the present disclosure. After consulting the present disclosure, one skilled in the art may envisage numerous other changes, substitutions, variations, alterations, and modifications without inventive activity, and it is intended that the present disclosure encompasses all such changes, substitutions, variations, alterations, and modifications as falling within its scope.

Figure 7:
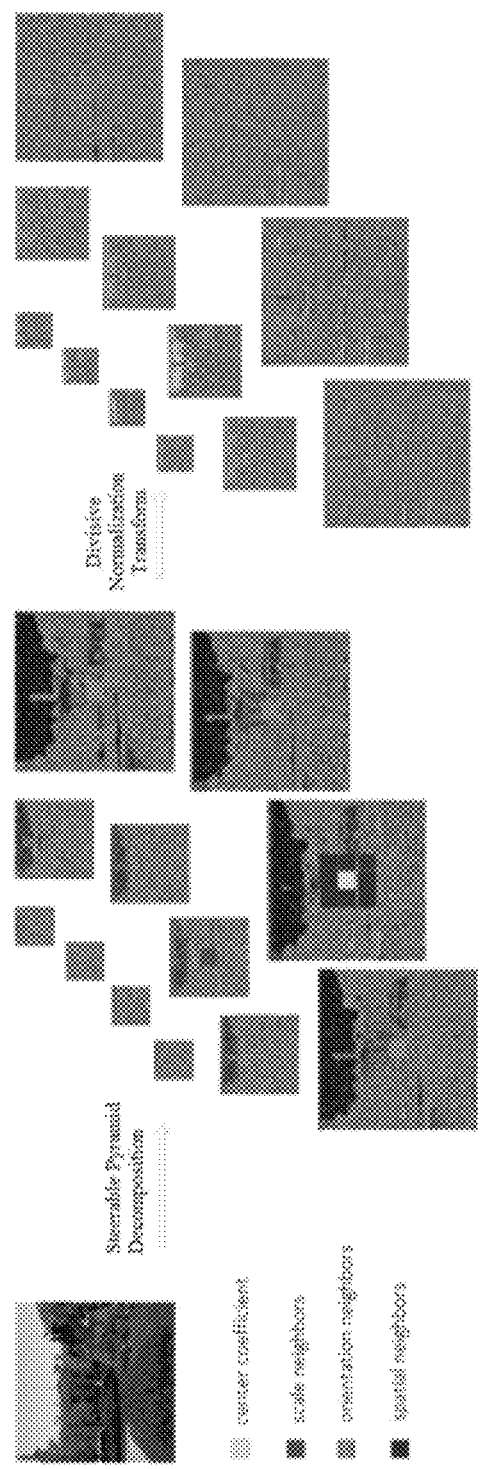
FIG. 7 illustrates the application of steerable pyramid decomposition and divisive normalization transform (DNT) on an image according to some embodiments of the present disclosure.

FIG. 7 illustrates the steerable pyramid decomposition and divisive normalization transform (DNT) performed on an image according to some embodiments of the present disclosure. The steerable pyramid decomposition may be a type of linear decomposition. The DNT operation may decompose an image into channels of different frequencies and orientations and then generate a normalized coefficient based on the average energy over a local neighborhood centered at a current coefficient. In some embodiments, the current coefficient may refer to the center coefficient in a 3×3 field of coefficients. As illustrated in FIG. 7, divisive normalization may be built upon a linear decomposition of an acquired image, followed by a nonlinear divisive normalization process.

A linear decomposition may include discrete cosine transform (DCT), wavelet transform, contourlet transform, curvelet transform, or the like, or a combination thereof. As illustrated in FIG. 7, a steerable pyramid wavelet decomposition may be performed to provide the local descriptions of an image in terms of space, scale, and/or orientation. As illustrated in FIG. 7, a steerable pyramid wavelet decomposition may include three scales and four orientations. In some embodiments, a steerable pyramid wavelet decomposition may include six scales and eight orientations.

A collection of neighboring wavelet coefficients including scale, orientation, and spatially neighboring wavelet coefficients of the central wavelet coefficient is shown in FIG. 7. The term "neighboring wavelet coefficient" used herein may refer to the wavelet coefficient of a neighbor pixel. The term "central wavelet coefficient" used herein may refer to the wavelet coefficient of a central pixel. A central pixel may be any pixel of an image. Let y denote the center coefficient, and the divisive normalization coefficient $\tilde{y}$ is defined by $$\tilde{y}=y/p, \tag{Equation 1}$$

where p may be a positive number called the divisive normalization factor. The divisive normalization factor may represent the total energy of the wavelet coefficients in the neighboring area around y (center coefficient).

Exemplary approaches used to calculate the normalization factor p may include the Gaussian scale mixture (GSM) model, etc. As illustrated in FIG. 7, the Gaussian scale mixture model may be used to calculate normalization factor p. If a random vector Y conforms to the GSM model, it may be the product of two independent random vectors, $$Y \overset{.}{=} zU, \tag{Equation 2}$$

where the sign $\overset{.}{=}$ may represent the equivalence in the probability distribution, z may be a random scalar called a mixing multiplier, and U may be a zero-mean Gaussian random vector with covariance $C_U$.

Comparing the definition of the DNT with that of the GSM model, the divisive normalization factor p may be acquired by estimating the mixing multiplier z. Specifically, the random vector Y in the GSM model may be formed by clustering a set of neighboring wavelet coefficients across space, scale, and/or orientation. Let $p_z(z)$ denote the probability density function of z, and the probability density of Y may be calculated by $$p_Y(Y) = \int \frac{1}{[2\pi]^{\frac{N}{2}}|z^2 C_U|^{\frac{1}{2}}} \exp\left(-\frac{Y^T C_U^{-1} Y}{2z^2}\right) p_z(z) dz, \tag{Equation 3}$$

where N may be the length of Y.

For simplicity, z may be set to a fixed value, and thus Y may become a zero-mean Gaussian random vector with a covariance of $z^2 C_U$. To further estimate the DNT center coefficient $\tilde{y}_c$, which may relate to the central pixel c, one may slide the vector window Y across the wavelet center coefficient $y_c$ in a wavelet sub-band and normalize $y_c$ using $$\tilde{y}_c = y_c/\hat{z}, \tag{Equation 4}$$

where $\hat{z}$ may be the maximum-likelihood estimate of z. $\hat{z}$ may be described by:

$$\hat{z} = \underset{z}{\mathrm{argmax}}\{\log p(Y|z)\}\underset{z}{\mathrm{argmin}}\left\{N\log z + \frac{Y^T C_U^{-1} Y}{2z^2}\right\} = \sqrt{\frac{Y^T C_U^{-1} Y}{N}}. \tag{Equation 5}$$

Here, $C_U = E[UU^T]$ may be estimated from the wavelet decomposition of part of or the entire image.

It should be noted that the above description of steerable pyramid decomposition and divisive normalization transform is provided for the purposes of illustration, not intended to limit the scope of the present disclosure. For persons having ordinary skills in the art, various variations and modifications may be conducted under the teaching of the present disclosure. However, those variations and modifications may not depart the protecting scope of the present disclosure.

Figure 8:
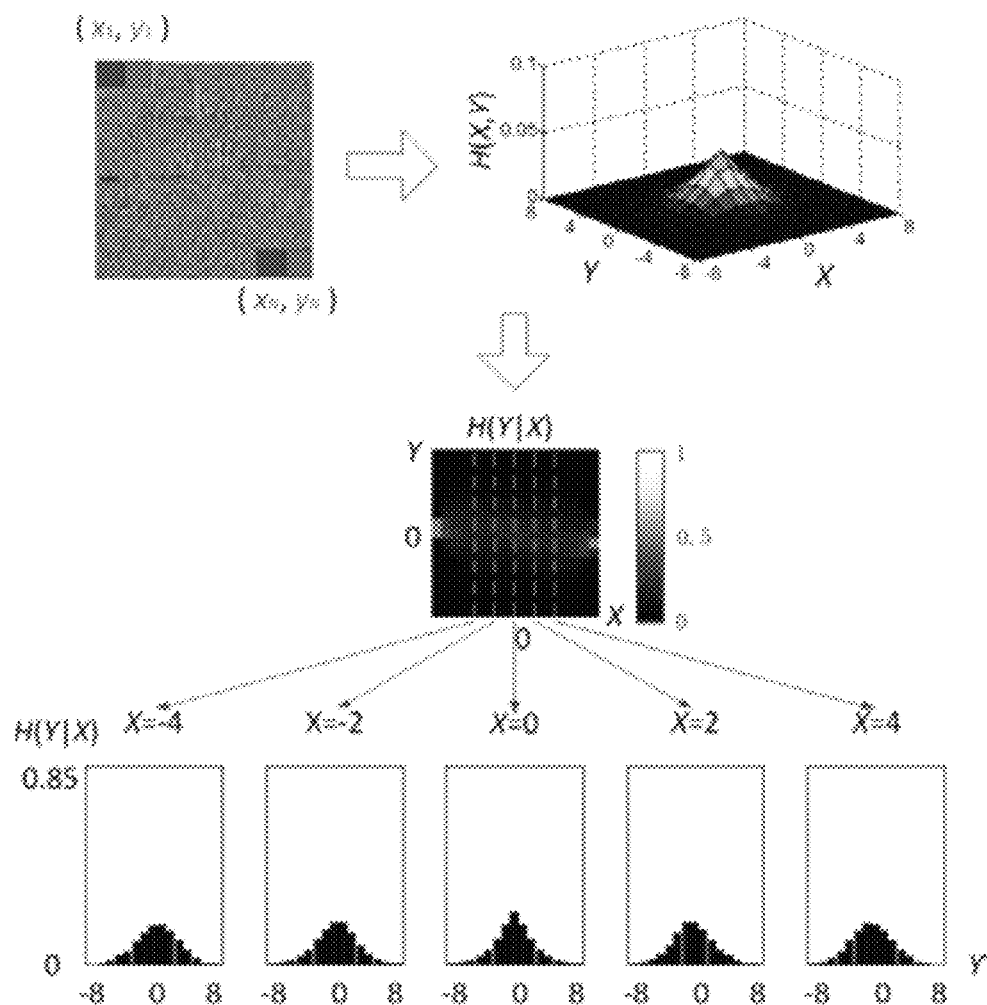
FIG. 8 illustrates joint and conditional histograms between horizontally neighboring DNT coefficients according to some embodiments of the present disclosure.
Figure 9A:
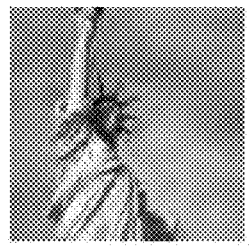
FIG. 9 illustrates degraded images with four typical distortion types and their corresponding feature vectors according to some embodiments of the present disclosure.
Figure 9A:
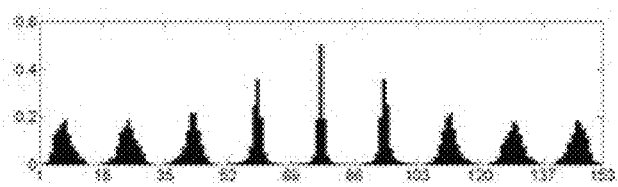
Figure 9B:
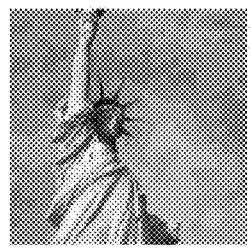
Figure 9B:
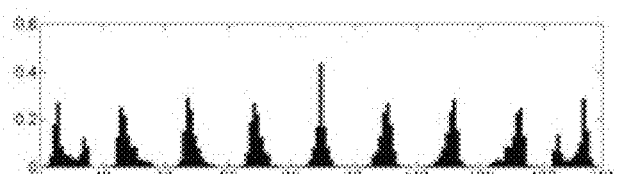
Figure 9C:
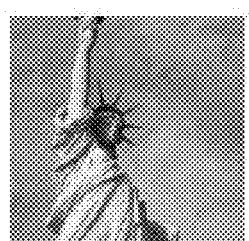
Figure 9C:
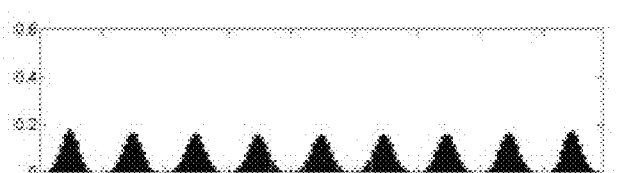
Figure 9D:
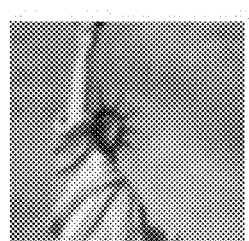
Figure 9D:
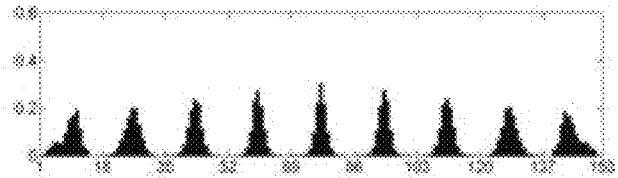

FIG. 8 illustrates joint and conditional histograms between horizontally neighboring DNT coefficients according to some embodiments of the present disclosure. In steerable pyramid wavelet decomposition, neighbor relationships may exist across space, scale, and/or orientation.

As illustrated in FIG. 8, a horizontally spatial neighbor relationship may be used as an example to illustrate the joint statistics.

As shown in FIG. 8, a pair of horizontally neighboring DNT coefficients may be denoted by a bivariate random vector (X,Y). Samples may be applied in a pixel-by-pixel manner from the top-left corner $(x_1, y_1)$ to the bottom-right corner $(x_N, y_N)$, where N is the total number of samples in an image.

The joint distribution of X and Y may be defined as H(X,Y). As illustrated in FIG. 8, the bin size of the joint histogram may be set to 17. The term "bin size" as used herein may refer to the number of consecutive, non-overlapping intervals of variable X. In some embodiments, the bin size of the joint histogram may be set to an integer that is no less than 3. In some embodiments, the bin size of the joint histogram may be set to any suitable integer between 3 and 17. In some embodiments, the bin size of the joint histogram may be set to an integer that is no less than 17.

As illustrated in FIG. 8, the values of the joint histogram may be normalized to [0,1]. In some embodiments, the values of the joint histogram may be normalized to [0,0.5] or [0,10] or [0,100], or other ranges of values.

The distribution of Y conditioned at different values of X may be defined as H(Y|X). The conditional histogram with different values of X may be independently rescaled to fill the range of intensities. As illustrated in FIG. 8, five representative conditional histograms conditioned at X=−4, −2, 0, 2 and 4 may be provided. In some embodiments, nine conditional histograms conditioned at X=−4, −3, −2, −1, 0, 1, 2, 3 and 4 may be provided.

It should be noted that the above description of calculating joint and conditional histograms is provided for the purposes of illustration, not intended to limit the scope of the present disclosure. For persons having ordinary skills in the art, various variations and modifications may be conducted under the teaching of the present disclosure. However, those variations and modifications may not depart the protecting scope of the present disclosure.

FIG. 9 illustrates distorted images with four typical distortion types: (FIG. 9A) JPEG2000, (FIG. 9B) JPEG, (FIG. 9C) Gaussian white noise, (FIG. 9D) Gaussian blur and their corresponding feature vectors according to some embodiments of the present disclosure.

A feature vector may be defined based on the pattern of a joint conditional histogram formed by conditional histograms conditioned at different values. In some embodiments, the number of the conditional histograms connected to form a joint conditional histogram may be between 1 and 17. In some embodiments, the number of conditional histograms connected to form a joint conditional histogram may be no less than 17.

As illustrated in FIG. 9, a 153-dimensional feature vector may be constructed based on the pattern of a combination of 9 conditional histograms conditioned at X=−4, −3, −2, −1, 0, 1, 2, 3 and 4. As another example, an 85-dimensional feature vector may be constructed based on the pattern of a combination of 5 conditional histograms conditioned at X=−4, −2, 0, 2 and 4. As a further example, a 289-dimensional feature vector may be constructed based on the pattern of a combination of 17 conditional histograms conditioned at X=−8, −7, −6, −5, −4, −3, −2, −1, 0, 1, 2, 3, 4, 5, 6, 7 and 8.

It should be noted that the above description of constructing feature vectors is provided for the purposes of illustration, not intended to limit the scope of the present disclosure. For persons having ordinary skills in the art, various variations and modifications may be conducted under the teaching of the present disclosure. However, those variations and modifications may not depart the protecting scope of the present disclosure. The dimension of the feature vector may be adjusted based on the bin size of the corresponding conditional histogram or the corresponding joint histogram.

Figure 10:
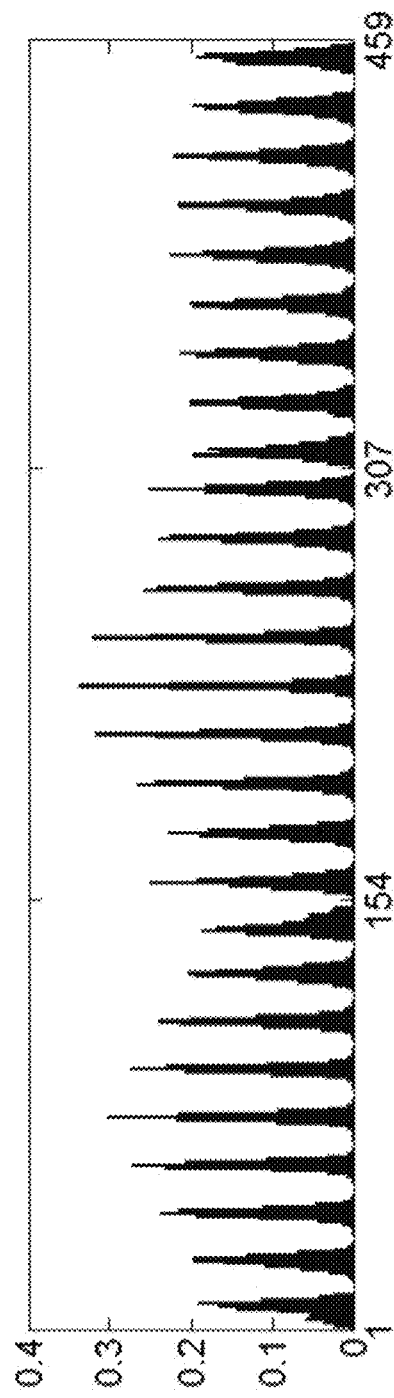
FIG. 10 illustrates a 459-dimensional feature vector extracted from an image with Gaussian blur according to some embodiments of the present disclosure.

FIG. 10 illustrates a 459-dimensional feature vector extracted from a degraded image with Gaussian blur according to some embodiments of the present disclosure.

A collection of neighboring DNT coefficients including scale, orientation, and/or spatially neighboring DNT coefficients (horizontal, vertical, main diagonal, and minor diagonal spatial neighboring DNT coefficients) of the central DNT coefficient may be obtained after DNT operation. As illustrated in FIG. 10, a collection of neighboring DNT coefficients including 3 scale neighboring DNT coefficients, 4 orientation neighboring DNT coefficients, and 4 spatially neighboring DNT coefficients (horizontal, vertical, main diagonal, and minor diagonal spatial neighboring DNT coefficients) of the central DNT coefficient may be obtained.

The differences between the patterns of joint conditional histograms with different orientation or spatial neighbor relationships may exist, while joint conditional histograms with a same orientation neighbor relationship, a same spatial neighbor relationship, but different scale neighbor relationships may share a similar pattern. As illustrated in FIG. 10, a 459-dimensional feature vector may be constructed based on joint conditional histograms with a same orientation neighbor relationship, a same spatial neighbor relationship, and 3 different scale neighbor relationships.

The dimension of a feature vector may depend on parameters including, without limitation, the bin size of the joint histogram, the number of conditional histograms connected (conditional histograms conditioned at different values of X), or the number of scale neighbor relationships.

As illustrated in FIG. 10, the bin size of the joint histogram may be set to 17. In some embodiments, the bin size of the joint histogram may be set to an integer that is no less than 3. In some embodiments, the bin size of the joint histogram may be set to an integer between 3 and 17. In some embodiments, the bin size of the joint histogram may be set to an integer that is no less than 17.

As illustrated in FIG. 10, the number of conditional histograms connected may be 9 (9 conditional histograms conditioned at X=−4, −3, −2, −1, 0, 1, 2, 3 and 4). In some embodiments, the number of conditional histograms connected may be between 1 and 17. In some embodiments, the number of conditional histograms connected may be no less than 17.

As illustrated in FIG. 10, the number of scale neighbor relationships may be 3. In some embodiments, the number of conditional histograms connected may be 2, or 6, or another positive integer.

The number of the feature vectors extracted from one image may depend on parameters including, without limitation, the number of orientation neighbor relationships, the number of spatial neighbor relationships, or the like, or a combination thereof. As illustrated in FIG. 10, the number of 459-dimensional feature vectors extracted from one image may be up to 16. In some embodiments, the number of feature vectors extracted from one image may be up to 32 (8 orientation and 4 spatial neighbor relationships).

It should be noted that the above description of constructing feature vectors is provided for the purposes of illustration, not intended to limit the scope of the present disclosure. For persons having ordinary skills in the art, various variations and modifications may be conducted under the teaching of the present disclosure. However, those variations and modifications may not depart the protecting scope of the present disclosure.

Figure 11:
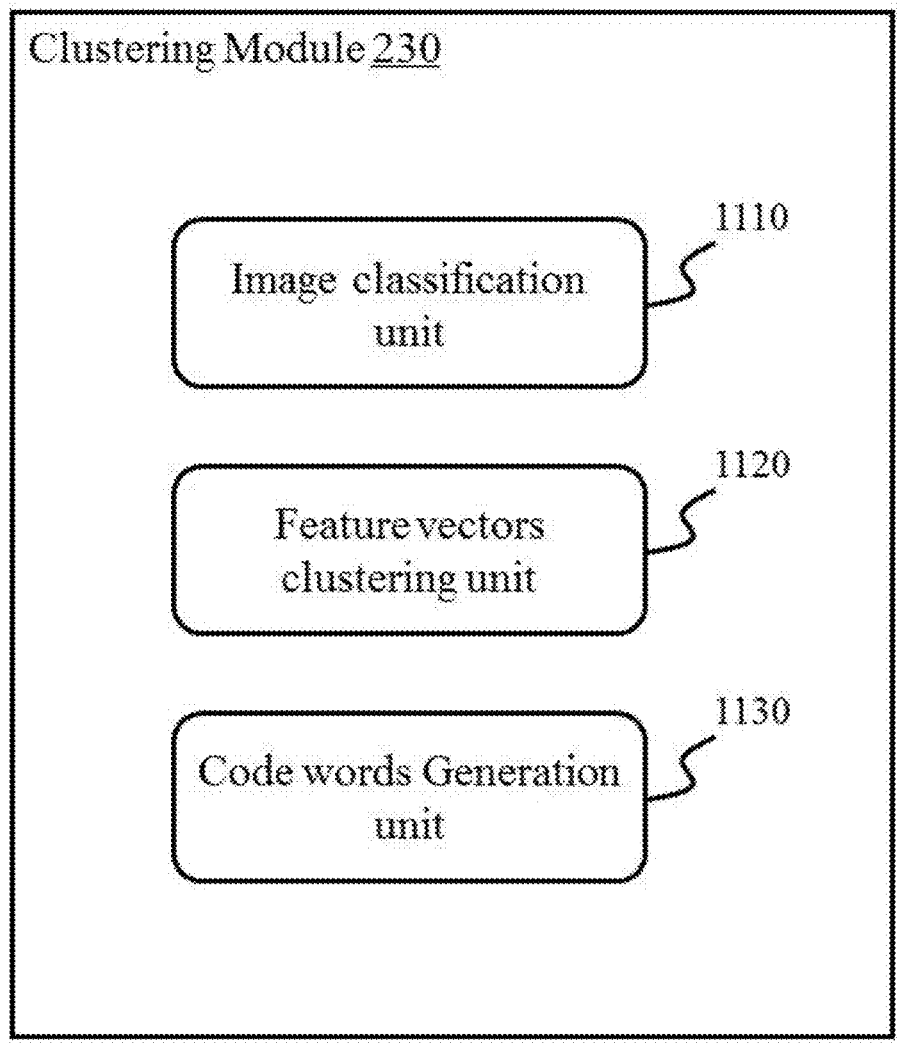
FIG. 11 shows a block diagram of a clustering module in a blind image quality assessment system according to some embodiments of the present disclosure.

FIG. 11 shows a block diagram of a clustering module in a blind image quality assessment system according to some embodiments of the present disclosure. In some embodiments, units of Clustering Module 230 may implement a clustering algorithm. In the FIG. 11 embodiment, units of Clustering Module 230 may include image classification unit 1110, feature vectors clustering unit 1120 and code words generation unit 1130.

As illustrated in FIG. 11, the image classification unit 1110 may be configured to perform image classification on a set of acquired images with reference scores. The acquired images may be divided into one or more levels based on their corresponding reference scores. The levels may relate to image quality. In some embodiments, the number of levels may be 15 when the set of images with reference scores are acquired from the CSIQ image database. In some embodiments, the number of levels may be 10 when the set of images with reference scores are acquired from the LIVE or TID2008 image database. In some embodiments, the number of levels may be another positive integer.

As illustrated in FIG. 11, the feature vectors clustering unit 1120 may cluster feature vectors of images on each level. In some embodiments, exemplary clustering algorithms employed by the feature vectors clustering unit 1120 may include but are not limited to k-means algorithm, or a variation of k-means algorithm (e.g., k-medoids, k-medians clustering, K-means++, Fuzzy c-means. Spectral Clustering, etc.), or the like, or a combination thereof.

As illustrated in FIG. 11, the code words generation unit 1130 may identify one or more centroids on each level. A centroid may be used as a code word. Merely by way of example, the number of centroids generated on each level may be 32 when the set of images with reference scores are acquired from the CSIQ or TID2008 image database. As another example, the number of centroids generated on each level may be 48 when the set of images with reference scores are acquired from the LIVE image database. In some embodiments, the number of centroids generated on each level may be another positive integer. The number of centroids generated on one level of image quality may be the same as or different from the number of centroids generated on another level of image quality.

A codebook may contain a set of code words. The codebook may include all or some of the centroids generated by clustering feature vectors. The number of code words in a codebook may depend on the number of levels and the number of centroids generated on each level. Merely by way of example, the number of code words in a codebook may be 480 when the set of images with reference scores are acquired from the CSIQ or LIVE image database. As another example, the number of code words in a codebook may be 320 when the set of images with reference scores are acquired from the TID2008 image database. As a further example, the number of code words in a codebook may be another positive integer.

It should be appreciated that the aforementioned units of the Clustering Module 230 may be implemented in hardware or software or in a combination of both. In some embodiments, units and operations of the Clustering Module 230 may be encompassed by modules and operations of one or more computer programs (e.g., an image management system). In some embodiments, units and operations of the Clustering Module 230 may be separate from the aforementioned one or more computer programs but may operate cooperatively with modules and operations thereof.

Figure 12:
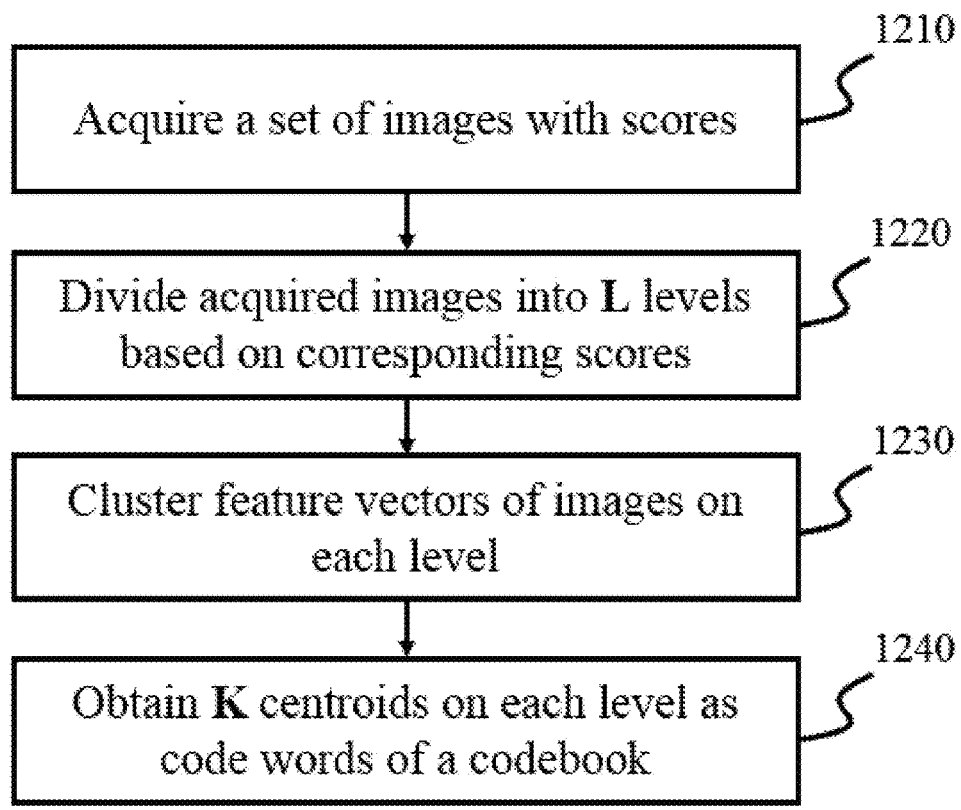
FIG. 12 shows a flowchart of the steps performed in codebook construction according to some embodiments of the present disclosure.

FIG. 12 shows a flowchart of the process for codebook construction according to some embodiments of the present disclosure. The flowchart includes a process that may be carried out by one or more processors and/or electronic components under the control of computer-readable and/or computer-executable instructions. Although specific steps are disclosed in the flowcharts, such steps are exemplary. That is, the present embodiments are well suited to performing various other steps or variations of the steps recited in the flowchart. Within various embodiments, it should be appreciated that the steps of the flowchart may be performed by software, by hardware or by a combination of both.

As illustrated in FIG. 12, in step 1210, a set of images with reference scores may be acquired. The acquisition may be accomplished by the acquisition module 210 as described in connection with FIG. 2. In some embodiments, acquired images may be images with the ratings of image quality provided by one or more human observers. The images may be retrieved from one or more public databases (e.g., LIVE, CSIQ, TID2008, TID2013, A57, MICT, IVC, IVC Art, etc.). In some embodiments, acquired images may be images with objective scores of image quality determined by other image quality assessment methods (e.g., Full-Reference image quality assessment methods, Reduced-Reference image quality assessment methods or other No-Reference image quality assessment methods). In some embodiments, acquired images may include but are not limited to natural images without distortion (e.g., Kodak Lossless True Color Image Suite), distorted images with the same distortion type or distorted images with different distortion types (e.g., JPEG Compression, JPEG2000 Compression, etc.).

In step 1220, acquired images may be divided into one or more levels based on their corresponding reference scores. The image classification may be accomplished by the image classification unit 1110 as described in connection with FIG. 11. In some embodiments, the number of levels may be 15 when the set of images with reference scores are acquired from the CSIQ image database. In some embodiments, the number of levels may be 10 when the set of images with reference scores are acquired from the LIVE or TID2008 image database. In some embodiments, the number of levels may be other positive integers when images from other databases are acquired.

In some embodiments, the acquired images may be divided into a number of levels evenly based on subjective scores, for example, mean opinion scores (MOS), difference mean opinion scores (DMOS), etc. In some embodiments, the acquired images may be divided into a number of levels unevenly based on subjective scores, for example, mean opinion scores (MOS), difference mean opinion scores (DMOS), etc. The DMOS value of images with different distortion types may differ. In some embodiments, the DMOS value of an image may vary in a range, for example, from 0 to 1. In some embodiments, 0 may indicate the best image quality, and 1 may indicate the worst image quality.

Before clustering, feature vectors of acquired images may be extracted. The number of feature vectors extracted from one image may depend on parameters including, without limitation, the number of orientation neighbor relationships or the number of spatial neighbor relationships. In some embodiments, the number of feature vectors extracted from one image may be up to 16 (4 orientation and 4 spatial neighbor relationships). In some embodiments, the number of feature vectors extracted from one image may be up to 32 (8 orientation and 4 spatial neighbor relationships). In some embodiments, the number of feature vectors extracted from one image may be more than 32.

In step 1230, feature vectors of acquired images on each level may be clustered. The clustering may be accomplished by the feature vectors clustering unit 1120 as described in connection with FIG. 11. In some embodiments, exemplary clustering algorithms employed by the feature vectors clustering unit 1120 may include but are not limited to the k-means algorithm, or a variation of the k-means algorithm (e.g., k-medoids, k-medians clustering, K-means++, Fuzzy c-means, Spectral Clustering, etc.), or the like, or a combination thereof.

In step 1240, one or more centroids on each level may be obtained as code words of a codebook. The code words generation may be accomplished by the code words generation unit 1130 as described in connection with FIG. 11. In some embodiments, the number of centroids generated on each level may be 32 when the set of images with reference scores are acquired from the CSIQ or TID2008 image database. In some embodiments, the number of centroids generated on each level may be 48 when the set of images with reference scores are acquired from the LIVE image database. In some embodiments, the number of centroids generated on each level may be other positive integers. A codebook may include all or partial of the centroids generated by clustering feature vectors as code words. The number of code words in a codebook may depend on the number of levels and the number of centroids generated on each level.

It should be noted that the above embodiments are provided for the purposes of illustration, and not intended to limit the scope of the present disclosure. After consulting the present disclosure, one skilled in the art may envisage numerous other changes, substitutions, variations, alterations, and modifications without inventive activity, and it is intended that the present disclosure encompasses all such changes, substitutions, variations, alterations, and modifications, as falling within its scope.

FIG. 13 illustrates the process of code words generation with K-means algorithm according to some embodiments of the present disclosure. In some embodiments, exemplary clustering algorithms employed to generate code words may include the k-means algorithm, a variations of the k-means algorithm (e.g., k-medoids, k-medians clustering, K-means++, Fuzzy c-means, Spectral Clustering, etc.), or the like, or a combination thereof.

The K-means algorithm is an iterative optimization algorithm based on two criteria: Nearest Neighbor Criterion and Centroid Condition. In an iteration, a training vector may be assigned to the corresponding code word based on Nearest Neighbor Criterion. Nearest Neighbor Criterion may be described with membership function:

$$\mu_j(x_i) = \begin{cases} 1, & \text{if } d(x_i, y_j) = d_{min}(x_i) \\ 0, & \text{otherwise} \end{cases} \quad \text{(Equation 6)}$$

where $\mu_j$ may be a membership function corresponded to the $j^{th}$ code word, $x_i$ may be the $i^{th}$ training vector, $y_j$ may be the $j^{th}$ code word, and d may be the distance between a training vector and a code word.

In the above membership function, $\mu_j$ may represent the degree of membership between the training vector $x_i$ and code word $y_j$. The value of $y_j$ may be 1 or 0, corresponded to full membership and no membership, respectively.

The following formula may be used to update the code word:

$$\hat{y}_j = \frac{\sum_{i=1}^{N} \mu_j(x_i) x_i}{\sum_{i=1}^{N} \mu_j(x_i)}, \quad \text{(Equation 7)}$$

where $\hat{y}_j$ may be the updated $j^{th}$ code word, and N may be the number of training vectors.

The K-means algorithm may be iteratively operated to perform the membership calculation and update the code word. The iteration may terminate when a criteria is satisfied. A final codebook is generated after a process of training. In some embodiments, the criteria for the termination of the algorithm may be satisfied when a reduce error rate K is less than a preset threshold. The reduce error rate K may be defined as:

$$\kappa^{(k)} = \frac{\tilde{D}^{(k-1)} - \tilde{D}^{(k)}}{\tilde{D}^{(k-1)}}, \quad \text{(Equation 8)}$$

where $\kappa^{(k)}$ may be the reduce error rate of the $k^{th}$ iteration, and $\tilde{D}^{(k-1)}$ may be the error of the $(k-1)^{th}$ iteration.

As illustrated in FIG. 13A through FIG. 13K, a diamond represents a code word, a circle represents a training vector, and a square represents a calculated centroid.

Figure 13A:
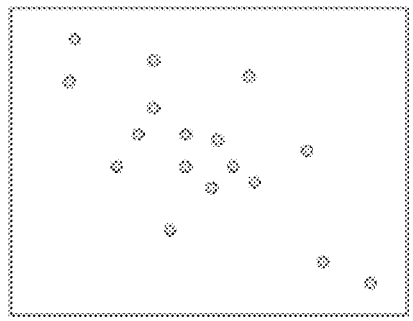
FIG. 13 illustrates the process of code word generation with a K-means algorithm according to some embodiments of the present disclosure.
Figure 13B:
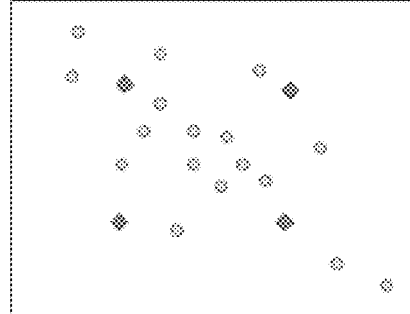
Figure 13C:
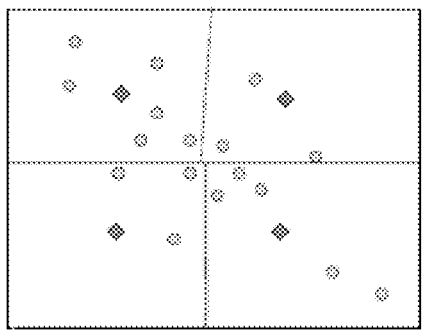
Figure 13D:
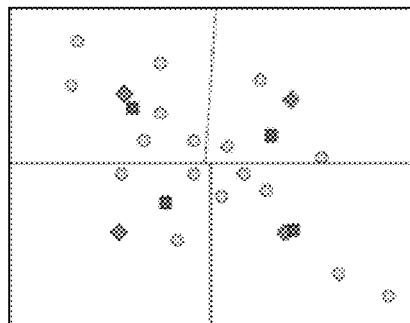
Figure 13E:
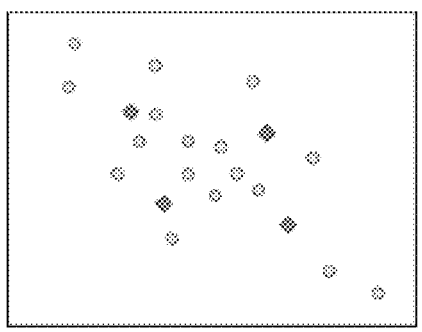
Figure 13F:
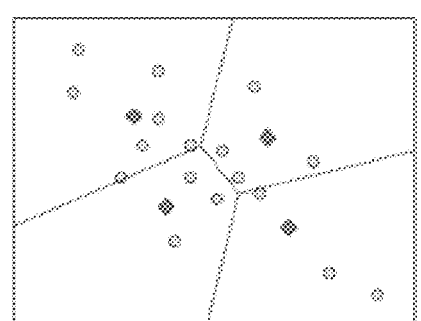
Figure 13G:
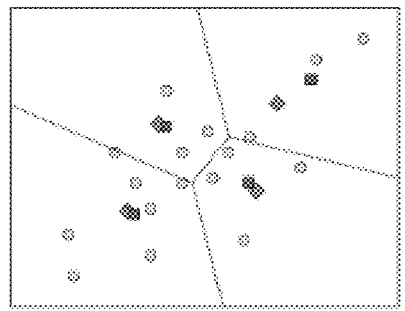
Figure 13H:
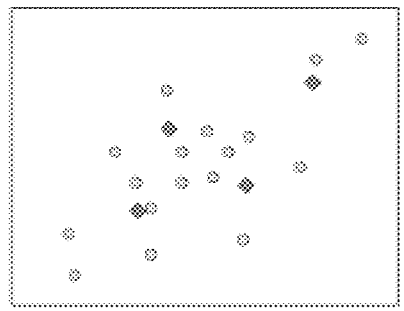
Figure 13I:
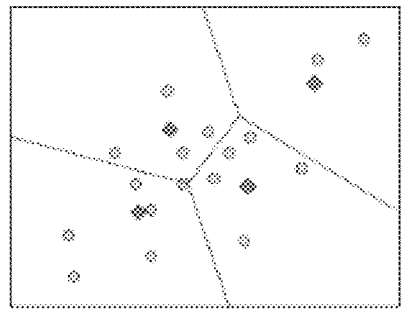
Figure 13J:
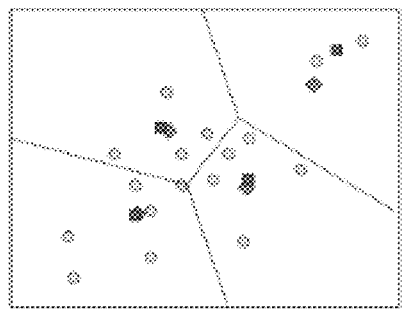
Figure 13K:
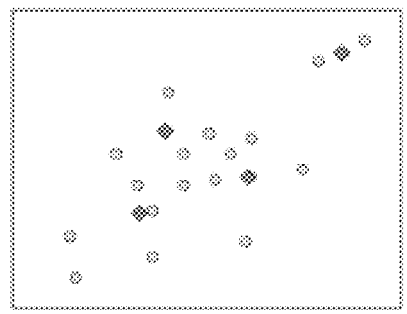
Figure 14D:
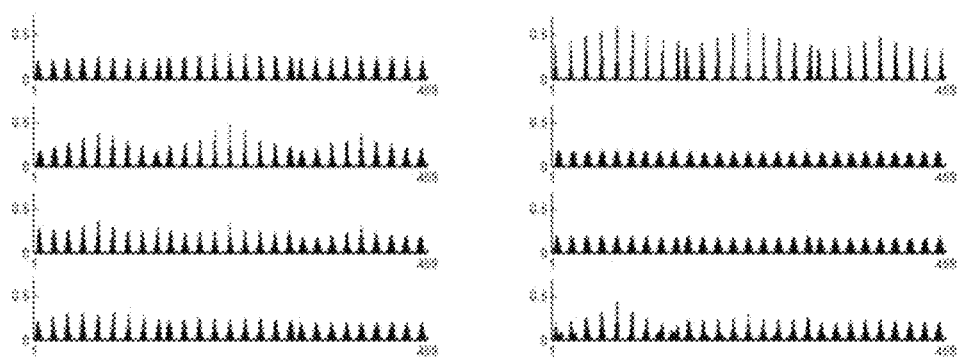
FIG. 14 illustrates a 5×8 codebook according to some embodiments of the present disclosure.
Figure 14E:
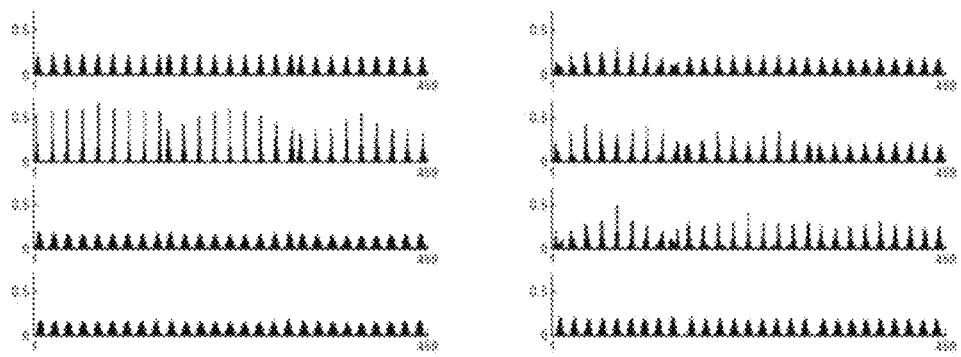

FIG. 13A illustrates a set of training vectors, while FIG. 13B illustrates a set of initial code words. As shown in FIG. 13C, a training vector may be assigned to the corresponding code word based on Nearest Neighbor Criterion. In FIG. 13D, centroids may be identified. As shown in FIG. 13E, code words may be updated with newly calculated centroids. FIG. 13F, FIG. 13G, and FIG. 13H illustrate one round of iteration of training vector assignment, centroids calculation, and code words update. FIG. 13I, FIG. 13J, and FIG. 13K illustrate a second iteration of training vector assignment, centroids calculation, and code words update.

In some embodiments, spectral clustering may be used to cluster feature vectors extracted from acquired images. Centroids generated by spectral clustering may depend on a criterion of shortest distance:

$$\min_{m_{l,k}} = (\Sigma_{k=1}^{K} \Sigma_{x_i \in G_{l,k}} \|x_i - m_{l,k}\|_2^2), \quad \text{(Equation 9)}$$

where $m_{l,k}$ may be the $k^{th}$ centroid on the $l^{th}$ FP level, K may be the number of centroids on each level of image quality, $x_i$ may be the $i^{th}$ training vector, and $G_{l,k}$ may represent a set of training vectors belonging to the $k^{th}$ centroid on the $l^{th}$ level.

It should be noted that the above description of clustering algorithms is provided for the purposes of illustration, not intended to limit the scope of the present disclosure. For persons having ordinary skills in the art, various variations and modifications may be conducted under the teaching of the present disclosure. However, those variations and modifications may not depart the protecting scope of the present disclosure.

FIG. 14A through FIG. 14E illustrate a 5×8 codebook generated by spectral clustering according to some embodiments of the present disclosure. As illustrated in FIG. 14, code words may be classified into 5 levels, and the number of code words on each level may be 8. FIG. 14A through FIG. 14E each represents a level with subjective scores from 1 to 5, respectively.

In some embodiments, the codebook may include all or some of the centroids generated by clustering feature vectors.

In some embodiments, the number of code words on different levels may be the same or different from each other. In some embodiments, the clustering algorithm may be modified to generate different number of code words on different levels. In some embodiments, the number of code words on different levels may be modified by the system or manually.

As illustrated in FIG. 14, each code word may be a 459-dimentional feature vector (3 scale neighbor relationships). In some embodiments, each code word may be a 153-dimentional feature vector (1 scale neighbor relationships). In some embodiments, each code word may be an 867-dimentional feature vector (3 scale neighbor relationships, 17 conditional histograms conditioned at X=−8, −7, −6, −5, −4, −3, −2, −1, 0, 1, 2, 3, 4, 5, 6, 7 and 8).

It should be noted that the above description of codebook generation is provided for the purposes of illustration, not intended to limit the scope of the present disclosure. For persons having ordinary skills in the art, various variations and modifications may be conducted under the teaching of the present disclosure. However, those variations and modifications may not depart the protecting scope of the present disclosure.

Figure 15:
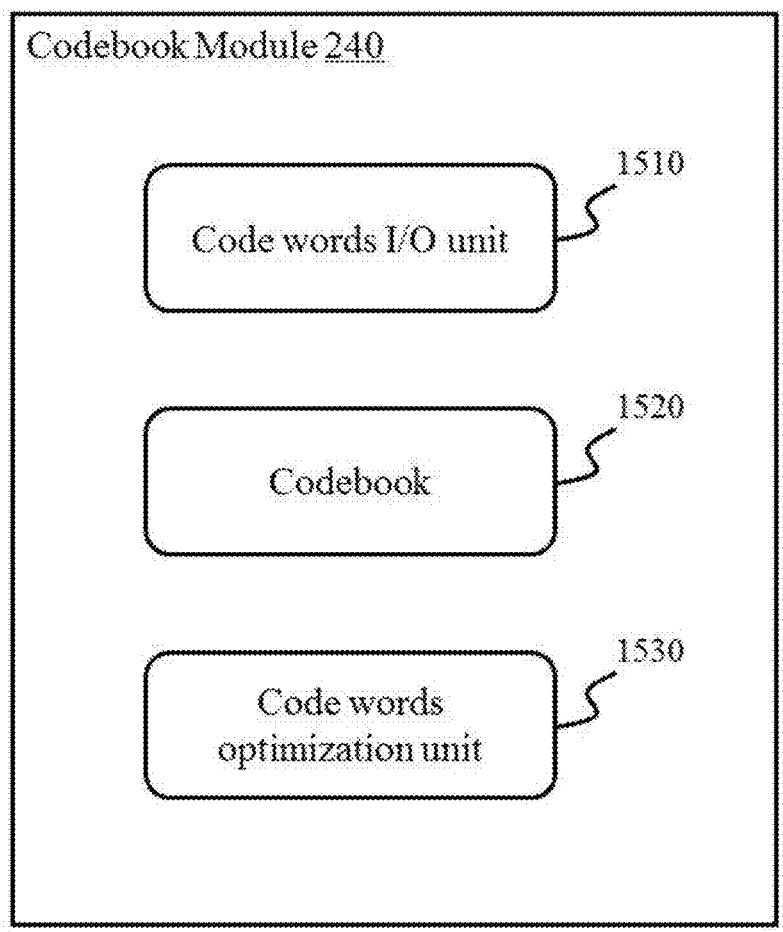
FIG. 15 shows a block diagram of a codebook module in a blind image quality assessment system according to some embodiments of the present disclosure.

FIG. 15 shows a block diagram of a codebook module in a blind image quality assessment system according to some embodiments of the present disclosure. In some embodiments, units of codebook module 240 may implement a codebook optimization algorithm. In the FIG. 15 embodiment, units of the codebook module 240 may include code words I/O unit 1510, codebook 1520 and Code words optimization unit 1530.

As illustrated in FIG. 15, the code words I/O unit 1510 may receive a set of cluster centers generated by Spectral Clustering. The code words I/O unit 1510 may further output the optimized code words.

As illustrated in FIG. 15, the codebook 1520 may store code words outputted by the code words I/O unit 1510. Code words in the codebook 1520 may include, without limitation, code words generated by Spectral Clustering or code words optimized by the code words optimization unit 1530.

As illustrated in FIG. 15, the code words optimization unit 1530 may perform fast bacterial swarming algorithm. In some embodiments, other code words optimization algorithms may be performed including, without limitation, Particle Swarm Optimization (PSO), Bacterial Foraging Algorithm (BFA), or variations of the Fast Bacterial Swarming Algorithm (FBSA).

It should be appreciated that the aforementioned units of the codebook module 240 may be implemented in hardware or software or in a combination of both. In some embodiments, units and operations of the codebook module 240 may be encompassed by modules and operations of one or more computer programs (e.g., an image management system). In some embodiments, units and operations of the codebook module 240 may be separate from the aforementioned one or more computer programs but may operate cooperatively with modules and operations thereof.

Figure 16:
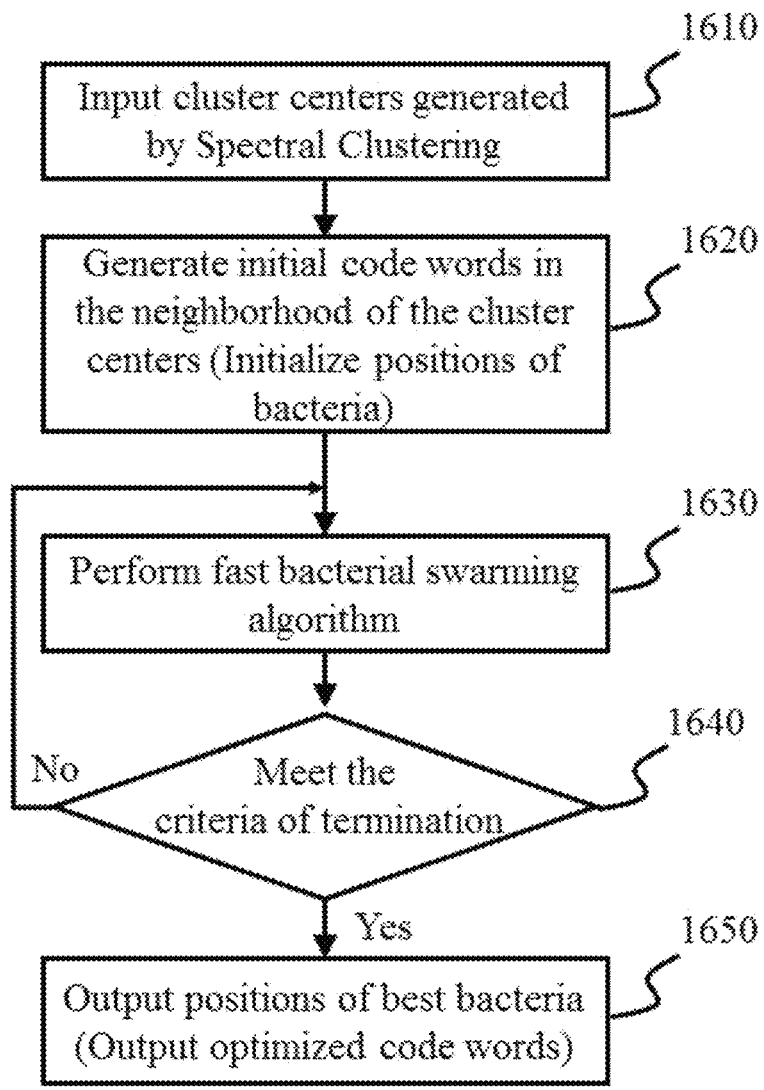
FIG. 16 shows a flowchart of the process for codebook optimization according to some embodiments of the present disclosure.

FIG. 16 shows a flowchart of the process for codebook optimization according to some embodiments of the present disclosure. The flowchart includes a process that may be carried out by one or more processors and/or electronic components under the control of computer-readable and/or computer-executable instructions. Although specific steps are disclosed in the flowcharts, such steps are exemplary. That is, the present embodiments are well suited to performing various other steps or variations of the steps recited in the flowchart. Within various embodiments, it should be appreciated that the steps of the flowchart may be performed by software, by hardware or by a combination of both.

As illustrated in FIG. 16, in step 1610, a set of cluster centers generated by spectral clustering may be inputted. The input may be accomplished by the code words I/O unit 1510 as described in connection with FIG. 15. Merely by way of example, cluster centers may be classified into 5 levels and the number of cluster centers on each level may be 8. As another example, each cluster center may be a 459-dimentional feature vector.

In step 1620, initial code words may be generated in the neighborhood of the received cluster centers. The initial code words generation may be accomplished by the code words optimization unit 1530 as described in connection with FIG. 15.

In step 1630, fast bacterial swarming algorithm may be performed to optimize the code words. The fast bacterial swarming optimization may be accomplished by the code words optimization unit 1530 as described in connection with FIG. 15.

In step 1640, the code words optimization unit 1530 may determine whether a criteria of termination is fulfilled. If not, the process may move to step 1630, otherwise the optimized code word may be outputted in step 1650. The output may be accomplished by the code words I/O unit 1510 as described in connection with FIG. 15.

Figure 17:
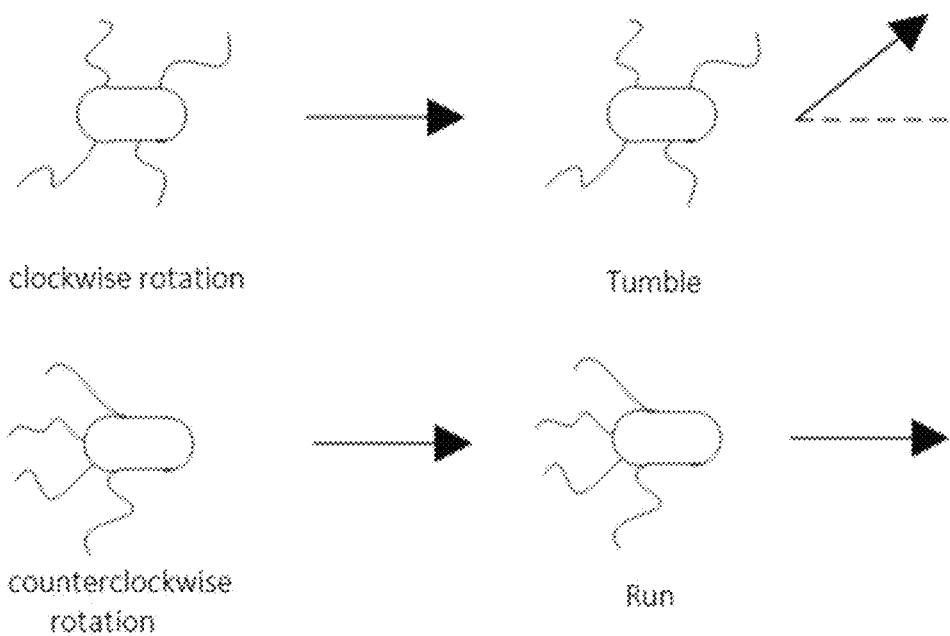
FIG. 17 illustrates two exemplary behaviors of the bacteria in the fast bacterial swarming algorithm according to some embodiments of the present disclosure.

FIG. 17 illustrates two exemplary behaviors of the bacteria in the fast bacterial swarming algorithm according to some embodiments of the present disclosure.

Fast bacterial swarming algorithm is a bio-inspired algorithm. Bacteria may have the tendency to gather around nutrient-rich areas by the activity called chemotaxis. The bacteria which fail to reach nutrient-rich areas may die due to lacking of nutrient, while the others survive and reproduce the next generation in nutrient-rich areas. In the bacterial environment, some bacteria may be dispersed to random regions once their current living environment is no longer suitable to live. This activity may allow the bacteria to climb the nutrient concentration in a gradient direction, searching for the areas plenty of nutrition.

As illustrated in FIG. 17, chemotaxis may be represented by two behaviors: a unit walk with random direction called tumble, and a unit walk toward the same direction as a previous step indicating a run. Flagella may be the locomotive organs of a bacterium involved in its chemotaxis. As shown in FIG. 17, when the flagella take a clockwise rotation, the bacterium may take a tumble. When the flagella take a counter clockwise rotation, the bacterium may take a run. A bacterium may take tumble followed by run. The position of the $i^{th}$ bacterium after a tumble may be represented as:

$$\theta^i(j+1,k,l) = \theta^i(j,k,l) + C \times \angle \varphi, \quad \text{(Equation 10)}$$

where $\theta^i$ may be the position of the $i^{th}$ bacterium; C may be the walk length of a moving behavior; $\angle \varphi$ may be the direction of a moving behavior; j may indicate the index for chemotaxis steps; k may represent the index for reproduction events; l may be the index for elimination-dispersal events.

It should be noted that the above description of behaviors of the bacteria is provided for the purposes of illustration, not intended to limit the scope of the present disclosure. For persons having ordinary skills in the art, various variations and modifications may be conducted under the teaching of the present disclosure. However, those variations and modifications may not depart the protecting scope of the present disclosure.

Figure 18:
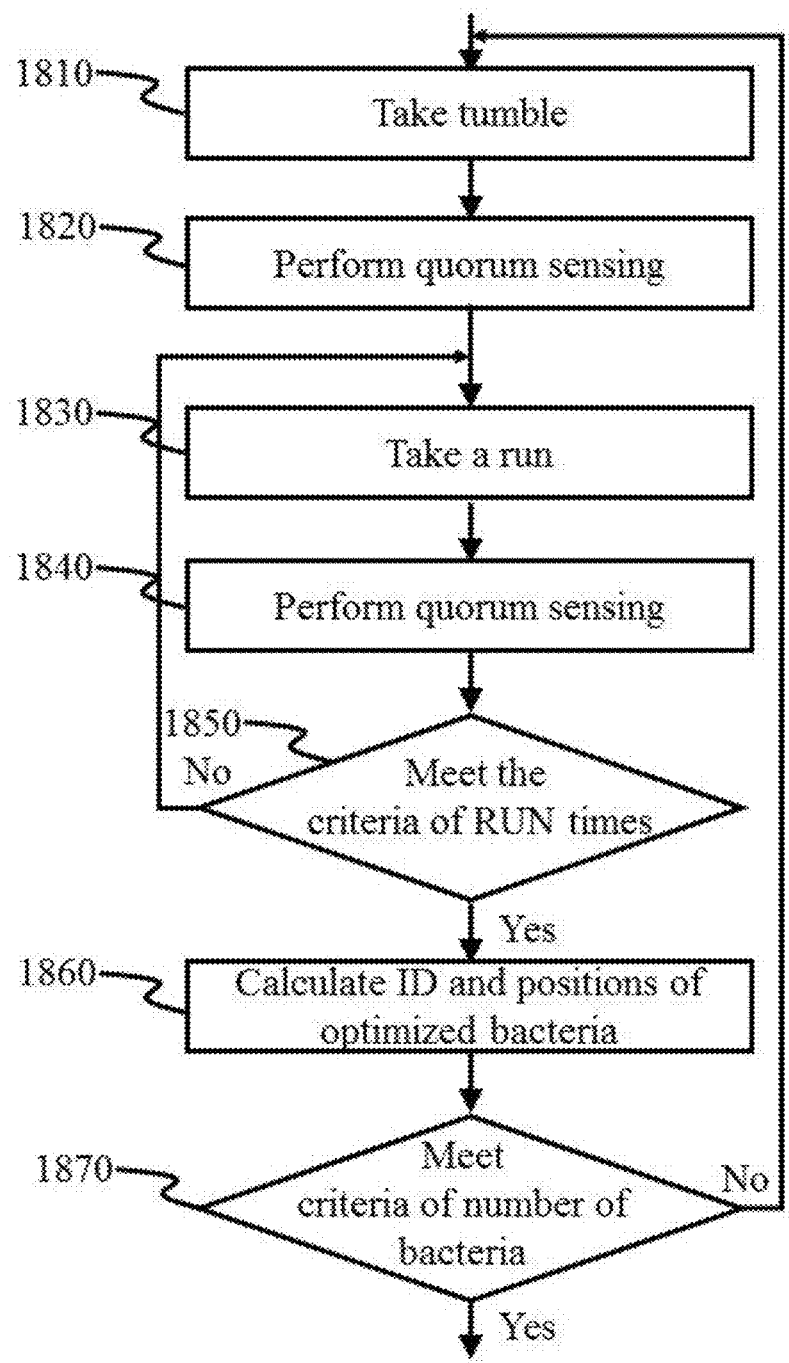
FIG. 18 shows a flowchart of the process of the fast bacterial swarming algorithm according to some embodiments of the present disclosure.

FIG. 18 shows a flowchart of the process of a fast bacterial swarming algorithm according to some embodiments of the present disclosure. The flowchart includes a process that may be carried out by one or more processors and/or electronic components under the control of computer-readable and/or computer-executable instructions. Although specific steps are disclosed in the flowcharts, such steps are exemplary. That is, the present embodiments are well suited to performing various other steps or variations of the steps recited in the flowchart. Within various embodiments, it should be appreciated that the steps of the flowchart may be performed by software, by hardware or by a combination of both.

As illustrated in FIG. 18, a bacterium may represent a codebook. The structure of the bacterium may be designed based on the structure of a codebook. In some embodiments, code words may be divided into L levels, the number of code words on each level may be K, and a code word may be an M-dimensional feature vector. As illustrated in FIG. 18, a bacterium may be defined as:

$$b=[x_{1,1,1}x_{1,1,2} \ldots x_{1,1,M}x_{1,2,1}x_{1,2,2} \ldots x_{1,2,M} \ldots$$
$$x_{l,k,M} \ldots x_{l,K,1}x_{l,K,2} \ldots x_{l,K,M} \ldots$$
$$x_{L,K,1}x_{L,K,2} \ldots x_{L,K,M}],$$  (Equation 11)

where b may represent a bacterium vector; $x_{l,k,M}$ may be the $m^{th}$ dimensional value of the $k^{th}$ code word on the $l^{th}$ level.

As illustrated in FIG. 18, in step 1810, the bacterium vector may take a tumble.

A quorum sensing may be performed to search the surrounding environment for the bacterium with a better position after a chemotaxis move (tumble or run). If a better position is identified, the better position may be memorized; otherwise the current position may be memorized. Then, the bacteria may move toward the memorized position.

When $J^i(j+1,k,l) > J_{min}(j,k,l)$, $$\theta_{cc}^i(j+1,k,l) = \theta^i(j+1,k,l) + C_{cc} \times (\theta^b(j,k,l) - \theta^i(j,k,l)),$$  (Equation 12)

where $J_{min}(j,k,l)$ may be the fitness value of the bacterium with the best position in the $j^{th}$ chemotaxis move, $k^{th}$ reproduction, and $l^{th}$ elimination-dispersal event; $\theta_{cc}^i(j+1,k,l)$ may be the updated position of the $i^{th}$ bacterium in the $(j+1)^{th}$ chemotaxis, $k^{th}$ reproduction, and $l^{th}$ elimination-dispersal event; $\theta^i(j+1,k,l)$ may be the position of the $i^{th}$ bacterium in the $(j+1)^{th}$ chemotaxis, $k^{th}$ reproduction, and $l^{th}$ elimination-dispersal event; $C_{cc}$ may be the index for attraction, representing the swimming range of the bacteria; $\theta^b(j,k,l)$ is the best bacterium position in the $j^{th}$ chemotaxis move, $k^{th}$ reproduction, and $l^{th}$ elimination-dispersal event.

In step 1820, a quorum sensing may be performed to search the surrounding environment for the bacterium with a better position after a tumble. The term "quorum sensing" as used herein may refer to an operation performed to search the surrounding environment for the bacterium with a better position each time after a chemotaxis move.

In step 1830, the bacterium vector may take a run followed by a quorum sensing performed in the step 1840.

In step 1850, the code words optimization unit 1530 may determine whether a first criterion is fulfilled. For instance, the first criterion may be that the number of runs reaches a first threshold. If the first criterion is not satisfied, the process may move to step 1830; otherwise the identifier and positions of optimized bacteria may be calculated in step 1860.

In step 1870, the code words optimization unit 1530 may determine whether a second criterion fulfilled. For instance, the second criterion may be that the number of bacteria reaches a second threshold. If the second criterion is not satisfied, the process may move to step 1810; otherwise the optimization may be terminated.

Figure 19:
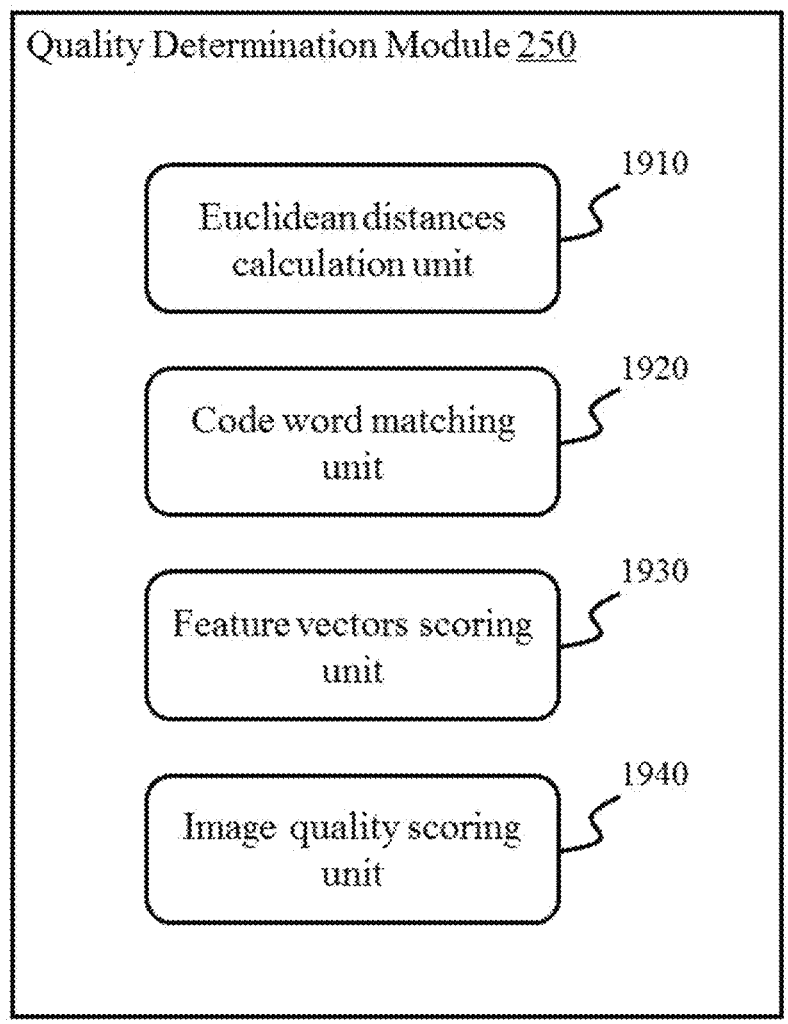
FIG. 19 shows a block diagram of a quality determination module in a blind image quality assessment system according to some embodiments of the present disclosure.

FIG. 19 shows a block diagram of a quality determination module in a blind image quality assessment system. In some embodiments, units of quality determination module 250 may implement a codebook based image quality assessment algorithm. In the FIG. 19 embodiment, units of quality determination module 250 may include Euclidean distances calculation unit 1910, code word matching unit 1920, feature vectors scoring unit 1930 and image quality scoring unit 1940.

As illustrated in FIG. 19, the Euclidean distances calculation unit 1910 may calculate Euclidean distances between feature vectors of a test image and code words in the codebook. In some embodiments, Euclidean distances between feature vectors of test image and all code words in the codebook may be calculated. In some embodiments, Euclidean distances between feature vectors of test image and some of the code words (e.g., code words representing a same distortion type) in the codebook may be calculated.

The code word matching unit 1920 may match feature vectors of the test image with code words on each level. In some embodiments, a code word may be matched on each level when the minimum Euclidean distance exists between the code word and the feature vector of test image.

The feature vectors scoring unit 1930 may calculate the scores of feature vectors. The image quality scoring unit 1940 may calculate average score of feature vectors as the score of test image.

It should be appreciated that the aforementioned units of quality determination module 250 may be implemented in hardware or software or in a combination of both. In some embodiments, units and operations of quality determination module 250 may be encompassed by modules and operations of one or more computer programs (e.g., an image management system). In some embodiments, units and operations of quality determination module 250 may be separate from the aforementioned one or more computer programs but may operate cooperatively with modules and operations thereof.

Figure 20:
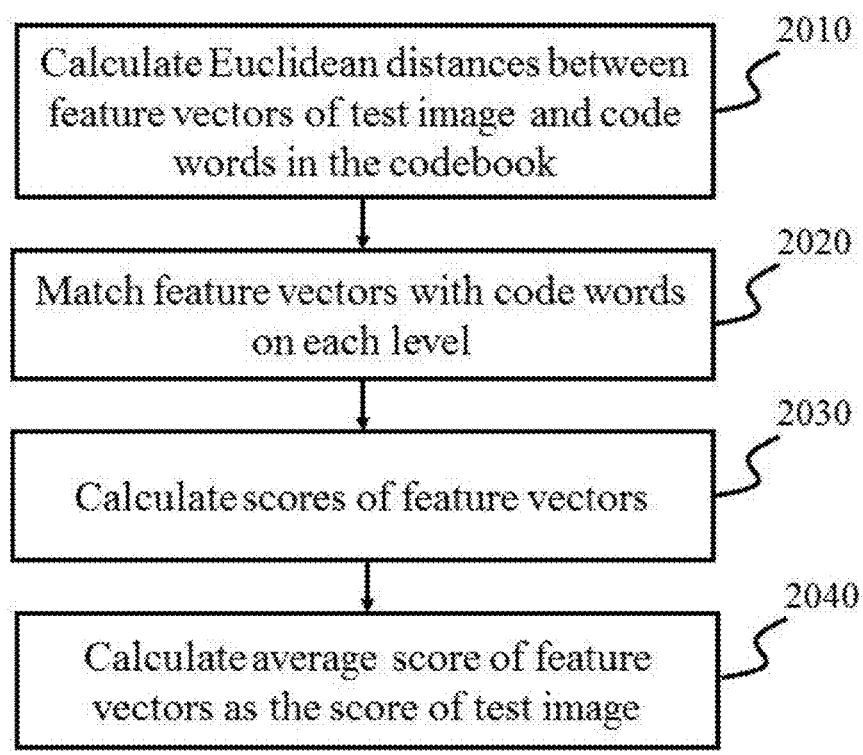
FIG. 20 shows a flowchart of the process for codebook based image quality assessment according to some embodiments of the present disclosure.

FIG. 20 shows a flowchart of the steps performed in codebook based image quality assessment according to some embodiments of the present disclosure. The flowchart includes a process that may be carried out by one or more processors and/or electronic components under the control of computer-readable and/or computer-executable instructions. Although specific steps are disclosed in the flowcharts, such steps are exemplary. That is, the present embodiments are well suited to performing various other steps or variations of the steps recited in the flowchart. Within various embodiments, it should be appreciated that the steps of the flowchart may be performed by software, by hardware or by a combination of both.

As illustrated in FIG. 20, in step 2010, Euclidean distances between feature vectors of test image and code words in the codebook may be calculated. The Euclidean distances calculation may be accomplished by the Euclidean distances calculation unit 1910 as described in connection with FIG.

19. The Euclidean distances between feature vectors of test image and code words in the codebook may be calculated with following formula:

$$d_{i,l,k} = \|x_i - m_{l,k}\|_2, \quad i=1,2,\ldots,M; \; l=1,2,\ldots,L; \; k=1,2,\ldots,K, \quad \text{(Equation 13)}$$

where $d_{i,l,k}$ may be the Euclidean distance between the $i^{th}$ feature vector $x_i$ and the $k^{th}$ code word on the $l^{th}$ level; M may be the number of feature vectors.

In step 2020, feature vectors of the test image may be matched with code word(s) on one or more levels. The code word matching may be accomplished by the code word matching unit 1920 as described in connection with FIG. 19. In some embodiments, one of the feature vectors of the test image may be matched with a code word on one or more levels when the minimum Euclidean distance exists between the code word and the feature vector. That is, one feature vector may be match to one code word. In some embodiments, in each level of the one or more levels, one of the feature vectors of the test image may be matched with a code word that has the minimum Euclidean distance with the feature vector. That is, one feature vector may be match to multiple code words corresponded to one or more levels.

In step 2030, scores of feature vectors may be calculated. The scores of the feature vectors may be calculated by the feature vectors scoring unit 1930 as described in connection with FIG. 19. The score of a feature vector may be calculated with following formula:

$$q_i = \frac{\sum_{l=1}^{L} o_l \exp(-d_{i,l}/\lambda)}{\sum_{l=1}^{L} \exp(-d_{i,l}/\lambda)}, \quad \text{(Equation 14)}$$

where $q_i$ may be the score of the $i^{th}$ feature vector; L may be the number of subjective score levels; $o_l$ may be the subjective score on the $l^{th}$ level; $d_{i,l}$ may be the Euclidean distance between the $i^{th}$ feature vector and the matched code word on the $l^{th}$ level; $\lambda$ may be an exponential decay coefficient. The exponential decay coefficient may represent the attenuation degree of an exponential curve.

In step 2040, an average score of the feature vectors may be calculated as the score of the test image. In some embodiments, the average score may be a weighted average based on Euclidean distances between one of the feature vectors of the test image and one or more code words of the codebook. The score of the image quality of the test image may be calculated by the image quality scoring unit 1940 as described in connection with FIG. 19. The score of a test image ma, be calculated with following formula:

$$q = \frac{1}{M} \sum_{i=1}^{M} q_i, \quad \text{(Equation 15)}$$

where q may be the score of a test image; M may be the number of feature vectors.

Figure 21:
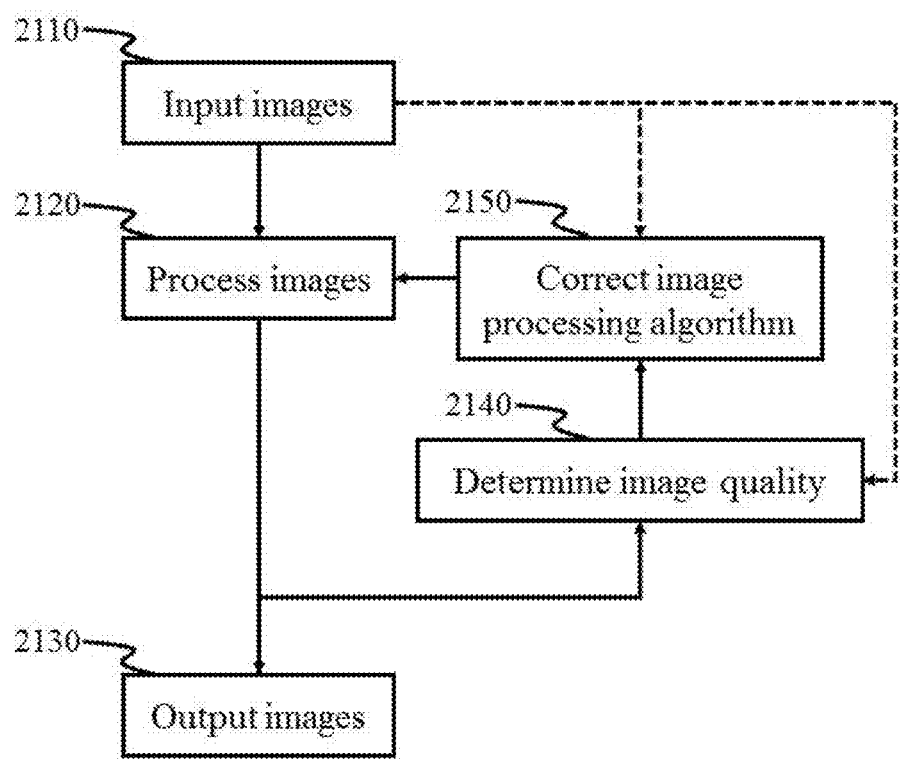
FIG. 21 illustrates an image processing system with IQA feedback according to some embodiments of the present disclosure.

FIG. 21 illustrates an image processing system with IQA feedback according to some embodiments of the present disclosure.

As illustrated in FIG. 21, in step 2110, images may be obtained. The obtained images may be distorted images with different distortion types. Exemplary distortion types may include JPEG Compression, JPEG2000 Compression, JPEG Transmission Errors, JPEG 2000 Transmission Errors, Non Eccentricity Pattern Noise, Local Block-wise Distortions of Different Intensity, Mean Shift, Contrast Change, White Gaussian Noise, Additive Gaussian Noise, Additive White Gaussian Noise, Additive Pink Gaussian Noise, Additive Noise in Color Components, Spatially Correlated Noise, Masked Noise, High Frequency Noise, Impulse Noise, Quantization Noise, Image De-noising, Gaussian Blurring, Fast Fading Rayleigh, Global Contrast Decrements, or the like, or a combination thereof.

In step 2120, the obtained images may be processed. In some embodiments, image processing may include, without limitation, image de-blurring, image restoration, image enhancing and image fusion.

In step 2130, the processed images may be outputted. In some embodiments, images may be outputted in different formats (e.g., bmp, jpg, tiff, gif, pcx, tga, exif, fpx, svg, psd, cdr, pcd, dxf, ufo, eps, ai, raw).

As shown in FIG. 21, in step 2140, the image quality of processed images may be determined. In some embodiments, the objective score determined by image quality assessment may be used as a feedback control signal.

In step 2150, the image processing algorithm may be corrected based on the scores generated by the image quality determination.

The foregoing Detailed Description is to be understood as being in every respect illustrative and exemplary, but not restrictive, and the scope of the disclosure herein is not to be determined from the Detailed Description, but rather from the claims as interpreted according to the full breadth permitted by the patent laws. It is to be understood that the embodiments shown and described herein are only illustrative of the principles of the present disclosure and that various modifications may be implemented by those skilled in the art without departing from the scope and spirit of the disclosure. Those skilled in the art could implement various other feature combinations without departing from the scope and spirit of the disclosure.

The various methods and techniques described above provide a number of ways to carry out the application. Of course, it is to be understood that not necessarily all objectives or advantages described can be achieved in accordance with any particular embodiment described herein. Thus, for example, those skilled in the art will recognize that the methods can be performed in a manner that achieves or optimizes one advantage or group of advantages as taught herein without necessarily achieving other objectives or advantages as taught or suggested herein. A variety of alternatives are mentioned herein. It is to be understood that some preferred embodiments specifically include one, another, or several features, while others specifically exclude one, another, or several features, while still others mitigate a particular feature by inclusion of one, another, or several advantageous features.

Furthermore, the skilled artisan will recognize the applicability of various features from different embodiments. Similarly, the various elements, features and steps discussed above, as well as other known equivalents for each such element, feature or step, can be employed in various combinations by one of ordinary skill in this art to perform methods in accordance with the principles described herein. Among the various elements, features, and steps some will be specifically included and others specifically excluded in diverse embodiments.

Although the application has been disclosed in the context of certain embodiments and examples, it will be understood by those skilled in the art that the embodiments of the application extend beyond the specifically disclosed embodiments to other alternative embodiments and/or uses and modifications and equivalents thereof.

In some embodiments, the terms "a" and "an" and "the" and similar references used in the context of describing a particular embodiment of the application (especially in the context of certain of the following claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. No language in the specification should be construed as indicating any non-claimed element essential to the practice of the application.

Preferred embodiments of this application are described herein, including the best mode known to the inventors for carrying out the application. Variations on those preferred embodiments will become apparent to those of ordinary skill in the art upon reading the foregoing description. It is contemplated that skilled artisans can employ such variations as appropriate, and the application can be practiced otherwise than specifically described herein. Accordingly, many embodiments of this application include all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

All patents, patent applications, publications of patent applications, and other material, such as articles, books, specifications, publications, documents, things, and/or the like, referenced herein are hereby incorporated herein by this reference in their entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that can be employed can be within the scope of the application. Thus, by way of example, but not of limitation, alternative configurations of the embodiments of the application can be utilized in accordance with the teachings herein. Accordingly, embodiments of the present application are not limited to that precisely as shown and described.

What is claimed is:

1. A method comprising:
    acquiring a plurality of training images, each training image having a reference score relating to image quality;
    extracting one or more feature vectors based on statistical independence between neighboring divisive normalization transform coefficients of each training image;
    identifying cluster centers of the feature vectors of the plurality of training images; and
    generating code words based on the cluster centers.

2. The method of claim 1, wherein a training image of the plurality of training images comprises at least one distortion type of JPEG Compression, JPEG2000 Compression, White Gaussian Noise, or Gaussian Blurring.

3. The method of claim 1, the extracting feature vectors comprising connecting a plurality of conditional histograms to generate a joint conditional histogram, the plurality of conditional histograms are conditioned at different values.

4. The method of claim 1, wherein the statistical independence between neighboring DNT coefficients is based on a pattern of joint conditional histograms between neighboring DNT coefficients.

5. The method of claim 1, wherein the reference score of a training image is a subjective score.

6. The method of claim 1, wherein the number of the feature vectors extracted from a training image is 16.

7. The method of claim 1, wherein the dimension of one of the one or more feature vectors is 459.

8. The method of claim 1, wherein the cluster centers are identified based on spectral clustering.

9. The method of claim 1, further comprising:
    optimizing the code words based on a fast bacterial swarming algorithm.

10. A method comprising:
    providing a codebook comprising a plurality of code words, each one of the plurality of code words having a reference score relating to image quality;
    acquiring a test image;
    extracting one or more feature vectors of the test image based on statistical independence between neighboring divisive normalization transform coefficients of the test image; and
    generating a score based on a comparison between the extracted one or more feature vectors of the test image and at least some of the plurality of code words and the corresponding reference scores.

11. The method of claim 10, the generating the score comprising:
    comparing the extracted one or more feature vectors of the test image with the at least some of the plurality of code words;
    identifying a code word based on the comparison; and
    determining the score of the test image based on the reference score of the identified code word.

12. The method of claim 11, the comparing comprising:
    determining a Euclidean distance between the extracted one or more feature vectors and each one of the at least some of the plurality of code words.

13. The method of claim 11, the identifying the code word is based on the Euclidean distances.

14. The method of claim 11, wherein
    the identifying a code word comprises identifying more than one code words; and
    the determining the score of the test image comprises calculating the score of the test image based on the reference scores of the identified code words.

15. A system comprising:
    a codebook comprising a plurality of code words, each one of the plurality of code words having a reference score relating to image quality;
    an acquisition module that acquires an image;

- a feature extractor that extracts one or more feature vectors based on statistical independence between neighboring divisive normalization transform coefficients of the image; and
- a quality determination module that generates a score based on the comparison between the extracted one or more feature vectors with at least some of the plurality of code words in the codebook and the corresponding reference scores.

16. The system of claim 15, wherein at least one code word in the codebook is a 459-dimensional feature vector.

17. The system of claim 15, wherein the plurality of code words are divided into 5 levels, and each level of the plurality of code words comprises one or more code words.

18. The system of claim 15, wherein the reference score of a code word is a subjective score.

* * * * *